US007474956B2

(12) United States Patent
Nakagawa et al.

(10) Patent No.: US 7,474,956 B2
(45) Date of Patent: Jan. 6, 2009

(54) AIR-FUEL RATIO CONTROL SYSTEM OF INTERNAL COMBUSTION ENGINE

(75) Inventors: Norihisa Nakagawa, Numazu (JP); Takahiko Fujiwara, Susono (JP); Taiga Hagimoto, Susono (JP); Junichi Kako, Susono (JP); Naoto Kato, Susono (JP); Shuntaro Okazaki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/885,266

(22) PCT Filed: Sep. 13, 2006

(86) PCT No.: PCT/JP2006/018544

§ 371 (c)(1),
(2), (4) Date: Aug. 29, 2007

(87) PCT Pub. No.: WO2007/032534

PCT Pub. Date: Mar. 22, 2007

(65) Prior Publication Data

US 2008/0147297 A1 Jun. 19, 2008

(30) Foreign Application Priority Data

Sep. 15, 2005 (JP) ............................. 2005-268295
Feb. 13, 2006 (JP) ............................. 2006-035479

(51) Int. Cl.
*G06F 19/00* (2006.01)
*F02D 41/14* (2006.01)
*F01N 3/10* (2006.01)

(52) U.S. Cl. ............................ 701/109; 60/276; 60/285

(58) Field of Classification Search ................. 123/672, 123/679; 701/101–103, 109, 114, 115; 60/274, 60/276, 277, 285, 299, 301
See application file for complete search history.

(56) References Cited

U.S. PATENT DOCUMENTS 5,444,977 A * 8/1995 Kawabata .................... 60/276

(Continued)

FOREIGN PATENT DOCUMENTS

JP 09268932 A * 10/1997 ................. 701/109

(Continued)

*Primary Examiner*—Willis R Wolfe, Jr.
(74) *Attorney, Agent, or Firm*—Oliff & Berridge, PLC

(57) ABSTRACT

An air-fuel ratio control system maintaining constant an oxygen storage amount or oxygen release amount per unit time with respect to an exhaust purification catalyst having an oxygen storage capacity even if the intake air amount changes is provided.

An air-fuel ratio control system of an internal combustion engine having an intake air amount detecting means, a linear air-fuel ratio sensor arranged at an upstream side of an exhaust purification catalyst, an $O_2$ sensor arranged at a downstream side of said exhaust purification catalyst, a target air-fuel ratio controlling means for performing feedback control of a target air-fuel ratio of exhaust flowing into the exhaust purification catalyst based on output information from the intake air amount detecting means and the $O_2$ sensor, and a fuel injection amount controlling means for performing feedback control of the fuel injection amount based on output information of the linear air-fuel ratio sensor so as to achieve the target air-fuel ratio, characterized in that the target air-fuel ratio controlling means performs feedback control of the target air-fuel ratio so that even when the intake air amount changes, a correction amount per unit time of an oxygen storage amount of the exhaust purification catalyst is made constant.

25 Claims, 13 Drawing Sheets

U.S. PATENT DOCUMENTS

| | | | | |
|---|---|---|---|---|
| 5,634,445 | A * | 6/1997 | Nishioka et al. | 123/306 |
| 5,771,688 | A * | 6/1998 | Hasegawa et al. | 60/276 |
| 5,832,724 | A * | 11/1998 | Watanabe et al. | 60/276 |
| 6,289,673 | B1 * | 9/2001 | Tayama et al. | 60/285 |
| 6,619,032 | B2 * | 9/2003 | Kakuyama et al. | 60/277 |
| 2003/0159434 | A1 | 8/2003 | Ikemoto et al. | |
| 2006/0005533 | A1 | 1/2006 | Takubo | |
| 2007/0125070 | A1 * | 6/2007 | Storhok et al. | 60/285 |

FOREIGN PATENT DOCUMENTS

| | | |
|---|---|---|
| JP | A-11-082114 | 3/1999 |
| JP | A-2003-254130 | 9/2003 |
| JP | A-2004-263591 | 9/2004 |
| JP | A-2006-002579 | 1/2006 |
| JP | A-2006-022772 | 1/2006 |

* cited by examiner

AIR-FUEL RATIO CONTROL SYSTEM OF INTERNAL COMBUSTION ENGINE

TECHNICAL FIELD

The present invention relates to an air-fuel ratio control system of an internal combustion engine having an exhaust purification catalyst in an exhaust passage, more particularly relates to an air-fuel ratio control system of an internal combustion engine using an output value of an air-fuel ratio sensor to control a fuel feed amount and control an air-fuel ratio of exhaust flowing into the exhaust purification catalyst to a desired air-fuel ratio.

BACKGROUND ART

In the past, as a means for purifying exhaust gas in automotive internal combustion engines, a three-way catalyst simultaneously promoting oxidation of incompletely burned components, that is, HC (hydrocarbons) and CO (carbon monoxide), and reduction of the NOx (nitrogen oxides) formed by reaction of the nitrogen in the air and the oxygen remaining unburned has been utilized. To raise the oxidation and reduction abilities of such a three-way catalyst, it is necessary to control the air-fuel ratio, which shows the combustion state of the internal combustion engine, to near the stoichiometric air-fuel ratio. For that purpose, in fuel injection control in an internal combustion engine, an $O_2$ sensor (oxygen concentration sensor) sensing whether the exhaust air-fuel ratio is richer or leaner than the stoichiometric air-fuel ratio based on the residual oxygen concentration in the exhaust is provided and air-fuel ratio feedback control correcting the fuel feed amount based on that sensor output is performed.

In such air-fuel ratio feedback control, the $O_2$ sensor for detecting the oxygen concentration is provided as much as possible at a location near the combustion chamber at the upstream side from the three-way catalyst. To compensate for fluctuations in the output characteristics of that $O_2$ sensor, a double $O_2$ sensor system further providing a second $O_2$ sensor at the downstream side of the three-way catalyst is also realized. That is, at the downstream side of the three-way catalyst, the exhaust gas is sufficiently agitated. The oxygen concentration is also in a substantial equilibrium state due to the action of the three-way catalyst, so the output of the downstream side $O_2$ sensor changes more gently than the output of the upstream side $O_2$ sensor and shows the rich/lean tendency of the air-fuel mixture as a whole. The double $O_2$ sensor system uses the catalyst upstream side $O_2$ sensor for main air-fuel ratio feedback control and uses the catalyst downstream side $O_2$ sensor for secondary air-fuel ratio feedback control. For example, by correcting the related constants in the main air-fuel ratio feedback control based on the output of the downstream side $O_2$ sensor, fluctuations in the output characteristic of the upstream side $O_2$ sensor can be absorbed and the precision of air-fuel ratio control can be improved.

Further, in recent years, an internal combustion engine using a three-way catalyst having an oxygen storage capacity and controlling the air-fuel ratio of the exhaust flowing into the three-way catalyst so that the three-way catalyst can constantly exhibit a certain stable purification performance has also been developed. The oxygen storage capacity of a three-way catalyst stores the excess amount of oxygen when the exhaust air-fuel ratio is in a lean state and releases the insufficient amount of oxygen when the exhaust air-fuel ratio is in a rich state to thereby purify the exhaust, but this capacity is limited. Therefore, to effectively use the oxygen storage capacity, it is crucial enable the exhaust air-fuel ratio to next become the rich state or lean state by maintaining the amount of oxygen stored in the three-way catalyst at a predetermined amount, for example, half of the maximum oxygen storage amount. If maintaining it in this way, a constant oxygen storage and release action becomes possible at all times and as a result constant oxidation and reduction abilities by the three-way catalyst are always obtained.

In an internal combustion engine controlling the oxygen storage amount to a constant level so as to maintain the purification performance of the three-way catalyst, for example, there is known an air-fuel ratio control system where air-fuel ratio sensors are arranged at both the upstream side and downstream side of the three-way catalyst, a linear air-fuel ratio sensor able to linearly detect the air-fuel ratio is arranged at the upstream side, and an $O_2$ sensor outputting a different output voltage depending on whether the exhaust air-fuel ratio is richer or leaner than the stoichiometric air-fuel ratio is arranged at the downstream side. In that air-fuel ratio control system, the linear air-fuel ratio sensor arranged at the upstream side of the three-way catalyst detects the air-fuel ratio of the exhaust flowing into the three-way catalyst, the $O_2$ sensor arranged at the downstream side of the three-way catalyst detects the air-fuel ratio state of the three-way catalyst atmosphere, the oxygen storage amount of the three-way catalyst is controlled to be constant by controlling the target air-fuel ratio of the exhaust flowing into the three-way catalyst based on the detection information of the $O_2$ sensors, and the air-fuel ratio of the exhaust flowing into the three-way catalyst is controlled to that target air-fuel ratio by feedback control of the fuel injection amount based on the output information of the linear air-fuel ratio sensor (see specification of Japanese Patent Publication (A) No. 11-82114).

DISCLOSURE OF THE INVENTION

In the above way, in an air-fuel ratio control system where the oxygen storage amount of a three-way catalyst is controlled to a constant level by feedback control of the target air-fuel ratio of the exhaust flowing into the three-way catalyst based on the detection information of the $O_2$ sensor and the air-fuel ratio of the exhaust flowing into the three-way catalyst is controlled to that target air-fuel ratio by feedback control of the fuel injection amount based on output information of a linear air-fuel ratio sensor, there is the problem that in an accelerating state or other large intake air amount state (hereinafter referred to as a "high Ga state"), there is a large correction amount of the oxygen storage amount of the three-way catalyst and the three-way catalyst atmosphere easily ends up greatly deviating from the air-fuel ratio range near the stoichiometric air-fuel ratio where the three-way catalyst removes all of the three HC, CO, and NOx components by 80% or more (hereinafter referred to as the "purification window").

In an air-fuel ratio control system where the oxygen storage amount of a three-way catalyst is controlled to a constant level by feedback control of the target air-fuel ratio of the exhaust flowing into the three-way catalyst based on the detection information of the $O_2$ sensor and the air-fuel ratio of the exhaust flowing into the three-way catalyst is controlled to that target air-fuel ratio by feedback control of the fuel injection amount based on output information of a linear air-fuel ratio sensor, even if the target air-fuel ratio of the exhaust flowing into the three-way catalyst is made the same target air-fuel ratio, if the intake air amount differs, the degree of the oxygen stored in or released from the three-way catalyst will differ. For example, if the target air-fuel ratio of the exhaust flowing into the three-way catalyst is controlled to the lean side from the stoichiometric air-fuel ratio, the larger the intake air amount, the greater the amount of oxygen stored in the three-way catalyst per unit time will be and the faster the amount of oxygen which the three-way catalyst can store, that is, the maximum oxygen storage amount, will end up being reached. Therefore, even if the target air-fuel ratio of the exhaust flowing into the three-way catalyst is made the same target air-fuel ratio value, the larger the intake air amount, the greater the oxygen storage amount per unit time with respect to the three-way catalyst will be, that is, a phenomenon will occur that there will be a large correction amount of the oxygen storage amount of the three-way catalyst and the three-way catalyst atmosphere will easily end up greatly deviating from the purification window.

The present invention, in consideration of the above problems, has as its object the provision of an air-fuel ratio control system able to maintain a correction amount per unit time of an oxygen storage amount of a three-way catalyst or other exhaust purification catalyst having an oxygen storage capacity constant even if the intake air amount changes, able to prevent an atmosphere of that exhaust purification catalyst from greatly deviating from a purification window, and able to improve the emission state.

According to the aspect of the invention of claim 1, there is provided an air-fuel ratio control system of an internal combustion engine having an exhaust purification catalyst having an oxygen storage capacity arranged in an exhaust passage of the internal combustion engine, storing oxygen in the exhaust when a concentration of oxygen in inflowing exhaust is in excess, and releasing stored oxygen when the concentration of oxygen in the exhaust is insufficient, an intake air amount detecting means for detecting an intake air amount of the internal combustion engine, a linear air-fuel ratio sensor arranged at an upstream side of the exhaust purification catalyst and having an output characteristic substantially proportional to an air-fuel ratio of the exhaust, an $O_2$ sensor arranged at a downstream side of the exhaust purification catalyst and sensing if an air-fuel ratio of the exhaust is rich or lean, a target air-fuel ratio controlling means for performing feedback control of a target air-fuel ratio of exhaust flowing into the exhaust purification catalyst based on detection information from the intake air amount detecting means and the $O_2$ sensor, and a fuel injection amount controlling means for performing feedback control of the fuel injection amount based on output information of the linear air-fuel ratio sensor so as to control the air-fuel ratio of the exhaust flowing into the exhaust purification catalyst to the target air-fuel ratio, the air-fuel ratio control system of an internal combustion engine characterized in that the target air-fuel ratio controlling means performs feedback control of the target air-fuel ratio so that even when the intake air amount changes, a correction amount per unit time of an oxygen storage amount of the exhaust purification catalyst is made constant.

That is, in the aspect of the invention of claim 1, the target air-fuel ratio controlling means feedback controls the target air-fuel ratio so as to make the correction amount per unit time of the oxygen storage amount of the exhaust purification catalyst constant even if the intake air amount changes, that is, so as to make the amount of oxygen stored in the purification catalyst per unit time or the amount of oxygen released per unit time from the exhaust purification catalyst constant, whereby, for example, even in a state where the intake air amount is large, the exhaust purification catalyst atmosphere can be prevented from greatly deviating from the purification window and the emission state can be improved.

According to the aspect of the invention of claim 2, the target air-fuel ratio controlling means executes target air-fuel ratio feedback control for at least PI control of the target air-fuel ratio, a proportional (P) correction term in the PI control is multiplied with a predetermined first correction coefficient set smaller the larger the intake air amount, and an integral (I) correction term is multiplied with a predetermined second correction coefficient set larger the larger the intake air amount.

According to the aspect of the invention of claim 3, there is provided an air-fuel ratio control system of an internal combustion engine having an exhaust purification catalyst having an oxygen storage capacity arranged in an exhaust passage of the internal combustion engine, storing oxygen in the exhaust when a concentration of oxygen in inflowing exhaust is in excess, and releasing stored oxygen when the concentration of oxygen in the exhaust is insufficient, an intake air amount detecting means for detecting an intake air amount of the internal combustion engine, a linear air-fuel ratio sensor arranged at an upstream side of the exhaust purification catalyst and having an output characteristic substantially proportional to an air-fuel ratio of the exhaust, an $O_2$ sensor arranged at a downstream side of the exhaust purification catalyst and sensing if an air-fuel ratio of the exhaust is rich or lean, a target air-fuel ratio controlling means for performing feedback control of a target air-fuel ratio of exhaust flowing into the exhaust purification catalyst based on detection information from the intake air amount detecting means and the $O_2$ sensor, and a fuel injection amount controlling means for performing feedback control of the fuel injection amount based on output information of the linear air-fuel ratio sensor so as to control the air-fuel ratio of the exhaust flowing into the exhaust purification catalyst to the target air-fuel ratio, the air-fuel ratio control system of an internal combustion engine characterized in that the target air-fuel ratio controlling means executes target air-fuel ratio feedback control for at least PI control of the target air-fuel ratio, a proportional (P) correction term in the PI control is multiplied with a predetermined first correction coefficient set smaller the larger the intake air amount, and an integral (I) correction term is multiplied with a predetermined second correction coefficient set larger the larger the intake air amount.

That is, in the aspects of the invention of claim 2 and claim 3, the feedback control of the target air-fuel ratio flowing into the exhaust purification catalyst is performed by PI control, the proportional (P) correction term in that PI control is multiplied with a first correction coefficient set smaller the larger the intake air amount, and the integral (I) correction term is multiplied with a second correction coefficient set larger the larger the intake air amount. Due to this, control is performed to make the correction amount per unit time of the oxygen storage amount of the exhaust purification catalyst constant.

According to the aspect of the invention of claim 4, there is provided an air-fuel ratio control system of an internal combustion engine as set forth in claim 2 or 3, characterized in that the target air-fuel ratio controlling means executes target air-fuel ratio feedback control for PID control of the target air-fuel ratio, the proportional (P) correction term and differential (D) correction term in the PID control are multiplied with a predetermined first correction coefficient set smaller the larger the intake air amount, and the integral (I) correction term is multiplied with a predetermined second correction coefficient set larger the larger the intake air amount.

That is, in the aspect of the invention of claim 4, the feedback control of the target air-fuel ratio flowing into the exhaust purification catalyst is performed by PI control plus D control, that is, PID control, the proportional (P) correction term and differential (D) correction term in that PID control are multiplied with a first correction coefficient set smaller the larger the intake air amount, and the integral (I) correction term is multiplied with a second correction coefficient set larger the larger the intake air amount. Due to this, control is performed to make the correction amount per unit time of the oxygen storage amount of the exhaust purification catalyst constant.

According to the aspect of the invention of claim 5, there is provided an air-fuel ratio control system of an internal combustion engine as set forth in claim 2 or 3, characterized in that the air-fuel ratio control system of an internal combustion engine further has a load rate detecting means for detecting a load rate expressing an amount of fresh air charged into the cylinders of the internal combustion engine, the proportional (P) correction term in the PI control is multiplied with the predetermined first correction coefficient set smaller the larger the intake air amount, and the integral (I) correction term is multiplied with, instead of the second correction coefficient, a predetermined third correction coefficient set larger the larger the load rate.

That is, in the aspect of the invention of claim 5, the system further has a load rate detecting means for detecting a load rate expressing an amount of fresh air charged into the cylinders of the internal combustion engine, the feedback control of the target air-fuel ratio flowing into the exhaust purification catalyst is performed by PI control, the proportional (P) correction term in the PI control is multiplied with a first correction coefficient set smaller the larger the intake air amount, and the integral (I) correction term is multiplied with, instead of the second correction coefficient set larger the larger the intake air amount, a third correction coefficient set larger the larger the load rate. Due to this, control is performed to make the correction amount per unit time of the oxygen storage amount of the exhaust purification catalyst constant.

The load rate (KL) expressing the amount of fresh air charged into the cylinders of the internal combustion engine is one of the parameters expressing the load of the internal combustion engine and is defined for example by the following equation:

$$KL(\%)=Mcair/((DSP/NCYL)\times \rho astd)\times 100$$

Here, Mcair is the amount of fresh air charged into the cylinders when the suction valve is opened and then closed, that is, the cylinder charging fresh air amount (g), DSP is the displacement of the engine (liters), NCYL is the number of cylinders, and ρastd is the air density in the standard state (1 atm, 25° C.) (about 1.2 g/liter).

The integral correction term performs the role of correcting deviation of the actual air-fuel ratio of the exhaust (actual air-fuel ratio) from the target air-fuel ratio of the exhaust flowing into the exhaust purification catalyst. The amount of fresh air charged into each cylinder changes depending on the intake air amount, so applying correction in accordance with the intake air amount enables feedback control of a target air-fuel ratio correcting deviation of the actual air-fuel ratio from the target air-fuel ratio. However, the fresh air amount charged into each cylinder changes depending on the engine speed, the number of cylinders, etc., so to enable more precise feedback control of a target air-fuel ratio, if there were a means for detecting the amount of fresh air charged into each cylinder, it would also possible to give correction in accordance with the amount of fresh air charged into each cylinder by an integral correction term instead of correction in accordance with the intake air amount.

In the aspect of the invention of claim 5, the system has a load rate detecting means for detecting a load rate expressing an amount of fresh air charged into the cylinders of the internal combustion engine, and the above third correction coefficient having the load rate as a parameter rather than the second correction coefficient having the intake air amount as a parameter is multiplied with the integral correction term so as to enable feedback control of a target air-fuel ratio in accordance with the load rate, that is, in accordance with the above cylinder charging fresh air amount, and enable more precise feedback control of a target air-fuel ratio.

According to the aspect of the invention of claim 6, there is provided an air-fuel ratio control system of an internal combustion engine as set forth in claim 5, characterized in that the target air-fuel ratio controlling means executes target air-fuel ratio feedback control for PID control of the target air-fuel ratio, the proportional (P) correction term and differential (D) correction term in the PID control are multiplied with a predetermined first correction coefficient set smaller the larger the intake air amount, and the integral (I) correction term is multiplied with, instead of the second correction coefficient, a predetermined third correction coefficient set larger the larger the load rate.

That is, in the aspect of the invention of claim 6, the feedback control of the target air-fuel ratio flowing into the exhaust purification catalyst is performed by PID control, the proportional correction term and differential correction term in that PID control are multiplied with a first correction coefficient set smaller the larger the intake air amount, and the integral correction term is multiplied with a third correction coefficient set larger the larger the load rate. Due to this, control is performed to make the correction amount per unit time of the oxygen storage amount of the exhaust purification catalyst constant.

According to the aspect of the invention of claim 7, there is provided an air-fuel ratio control system of an internal combustion engine as set forth in any one of claims 2 to 6, characterized in that the air-fuel ratio control system of an internal combustion engine further has an oxygen storage capacity detecting means for detecting a maximum oxygen storage amount of the exhaust purification catalyst, and the proportional correction term is further multiplied with a predetermined fourth correction coefficient set larger the larger the maximum oxygen storage amount.

According to the aspect of the invention of claim 8, there is provided an air-fuel ratio control system of an internal combustion engine as set forth in claim 4 or claim 6, characterized in that the air-fuel ratio control system of an internal combustion engine further has an oxygen storage capacity detecting means for detecting a maximum oxygen storage amount of the exhaust purification catalyst, and the proportional correction term and the differential correction term are further multiplied with a predetermined fourth correction coefficient set larger the larger the maximum oxygen storage amount.

That is, in the aspects of the invention of claim 7 and claim 8, when the target air-fuel ratio feedback control is by PI control, the proportional correction term, while when by PID control, the proportional correction term and differential correction term, are further multiplied with a fourth correction coefficient set proportional to the maximum oxygen storage amount of the exhaust purification catalyst. Due to this, target air-fuel ratio feedback control in accordance with the maximum oxygen storage amount of the exhaust purification catalyst becomes possible. For example, control may be performed so that the smaller the maximum oxygen storage amount of the exhaust purification catalyst, the smaller the oxygen storage amount or oxygen release amount per unit time of the exhaust purification catalyst is made. Even if the maximum oxygen storage amount of the exhaust purification catalyst degrades or drops, the exhaust purification catalyst atmosphere can be prevented from greatly deviating from the purification window, and the emission state can be improved.

According to the aspect of the invention of claim 9, there is provided an air-fuel ratio control system of an internal combustion engine as set forth in any one of claims 2 to 8, characterized in that the air-fuel ratio control system of an internal combustion engine further has a startup state judging means for detecting a duration from startup of the internal combustion engine and judging if the internal combustion engine is in a state immediately after startup, and the startup state judging means judges that the internal combustion engine is in a state immediately after startup when the duration from startup of the internal combustion engine has not reached a predetermined time and prohibits correction by multiplication with the first correction coefficient in the target air-fuel ratio feedback control.

According to the aspect of the invention of claim 10, there is provided an air-fuel ratio control system of an internal combustion engine as set forth in any one of claims 2 to 8, characterized in that the air-fuel ratio control system of an internal combustion engine further has an F/C state judging means for detecting a duration of a state where feed of fuel to the internal combustion engine is cut and a duration from when the cut of feed of fuel to the internal combustion engine is suspended and fuel feed is restored and judging if the internal combustion engine is in the fuel feed cut state, the F/C state judging means judging that the internal combustion engine is in a fuel feed cut state when the fuel feed cut of the internal combustion engine continues for a predetermined time or more or when a duration of fuel feed after suspension of the fuel feed cut of the internal combustion engine has not reached a predetermined time and prohibiting correction by multiplication with the first correction coefficient in the target air-fuel ratio feedback control.

According to the aspect of the invention of claim 11, there is provided an air-fuel ratio control system of an internal combustion engine as set forth in any one of claims 2 to 8, characterized in that the air-fuel ratio control system of an internal combustion engine further has an idling state judging means for detecting a duration of an idling state of the internal combustion engine and a duration from start of normal operation after the end of idling of the internal combustion engine and judging if the internal combustion engine is in an idling state, the idling state judging means judging that the internal combustion engine is in an idling state when an idling state of the internal combustion engine continues for a predetermined time or more or when a duration of normal operation after the end of idling of the internal combustion engine has not reached a predetermined time and prohibiting correction by multiplication with the first correction coefficient in the target air-fuel ratio feedback control.

The state immediately after startup of an internal combustion engine, after restoration from a long fuel feed cut, or after left in a long idling is a state where a state of a small intake air amount continues and a state where the exhaust purification catalyst temperature easily falls. In an environment where the exhaust purification catalyst temperature easily drops, it is known that the maximum oxygen storage amount of the exhaust purification catalyst falls. Therefore, in such a state, control is necessary to make the oxygen storage amount or oxygen release amount per unit time of the exhaust purification catalyst smaller. However, the state immediately after startup of an internal combustion engine, after restoration from a long fuel feed cut, or after left in a long idling is also a state where the intake air amount is small, so when target air-fuel ratio feedback control is executed where a first correction coefficient set smaller the larger the intake air amount, that is, a first correction coefficient set larger the smaller the intake air amount, is multiplied with the proportional correction term and differential correction term, control ends up being performed so that the oxygen storage amount or oxygen release amount per unit time of the exhaust purification catalyst becomes larger, so excessive hunting occurs and the emission state or drivability may be deteriorated. Therefore, in the aspects of the invention of claim 9, claim 10, and claim 11, in a state where a state of a small intake air amount continues such as a state immediately after startup of an internal combustion engine, after restoration from a long fuel feed cut, or after left in a long idling, it is possible to prohibit correction by multiplication of the proportional correction term and differential correction term in the target air-fuel ratio feedback control with the first correction coefficient dependent on the intake air amount to prevent excessive hunting and improve the emission state and drivability.

According to the aspect of the invention of claim 12, there is provided an air-fuel ratio control system of an internal combustion engine as set forth in any one of claims 2 to 8, characterized in that the air-fuel ratio control system of an internal combustion engine further has an engine speed detecting means, where when processing for calculation of the integral correction term in the target air-fuel ratio feedback control is performed by a processing routine synchronized with each fuel injection, the integral correction term is multiplied with a fifth correction coefficient set smaller the larger the engine speed.

That is, in the aspect of the invention of claim 12, considering the effect of the engine speed in the calculation of the correction amount of the integral correction term when the processing for calculation of the correction amount of the integral correction term in the target air-fuel ratio feedback control is executed by a processing routine synchronized with each fuel injection, when calculating the integral correction amount in feedback control of the target air-fuel ratio, a fourth correction coefficient set smaller the larger the engine speed is added as a parameter. Due to this, the effect of the engine speed on the control for making the correction amount per unit time of the oxygen storage amount of an exhaust purification catalyst having an oxygen storage capacity constant can be suppressed.

According to the aspect of the invention of claim 13, there is provided an air-fuel ratio control system of an internal combustion engine as set forth in any one of claims 2 to 8, characterized in that processing for calculation of the integral correction term in the target air-fuel ratio feedback control is performed by a processing routine synchronized with each predetermined time.

That is, in the aspect of the invention of claim 13, the processing for calculation of the integral correction amount in the target air-fuel ratio feedback control is not executed by a processing routine synchronized with each fuel injection, but is executed by a processing routine synchronized with each predetermined time. Due to this, the effect of the engine speed on the control for making the correction amount per unit time of the oxygen storage amount of an exhaust purification catalyst having an oxygen storage capacity constant can be suppressed.

According to the aspect of the invention of claim 14, there is provided an air-fuel ratio control system of an internal combustion engine as set forth in any one of claims 2 to 8, characterized in that the air-fuel ratio control system of an internal combustion engine further has a rich control state judging means for judging whether the engine is in a rich control state for making an atmosphere of the exhaust purification catalyst a rich air-fuel ratio quickly when the feed of fuel to the internal combustion engine is restored from a cut state, where when the rich control state judging means judges the engine is in the rich control state, it prohibits for a predetermined period correction by multiplication with the first correction coefficient in the target air-fuel ratio feedback control.

That is, in the aspect of the invention of claim 14, when the rich control state judging means judges that the state is a rich control state at the time of restoration from a fuel feed cut, correction by multiplication with the first correction coefficient set depending on the intake air amount is prohibited for a predetermined period. Due to this, it is possible to reliably make the exhaust purification catalyst atmosphere a rich air-fuel ratio and possible to quickly restore the purifying action of the exhaust purification catalyst, which had dropped due to the fuel feed cut, to a suitable state.

According to the description of the claims, in an air-fuel ratio control system where the oxygen storage amount of an exhaust purification catalyst having an oxygen storage capacity is controlled to a constant level by feedback control of the target air-fuel ratio of the exhaust flowing into the exhaust purification catalyst based on the detection information of the $O_2$ sensor and the air-fuel ratio of the exhaust flowing into the exhaust purification catalyst is controlled to that target air-fuel ratio by feedback control of the fuel injection amount based on output information of a linear air-fuel ratio sensor, there are the common effects that it is possible to make the amount of correction per unit time of the oxygen storage amount of an exhaust purification catalyst having an oxygen storage capacity constant even if the intake air amount changes, possible to prevent the exhaust purification catalyst atmosphere from greatly deviating from the purification window, and possible to improve the emission state.

Below, the present invention will be able to be understood more sufficiently from the attached drawings and the description of the preferred embodiments of the present invention.

BEST MODE FOR CARRYING OUT THE INVENTION

Below, an embodiment of an air-fuel ratio control system of an internal combustion engine of the present invention will be explained with reference to the attached drawings.

Figure 1:
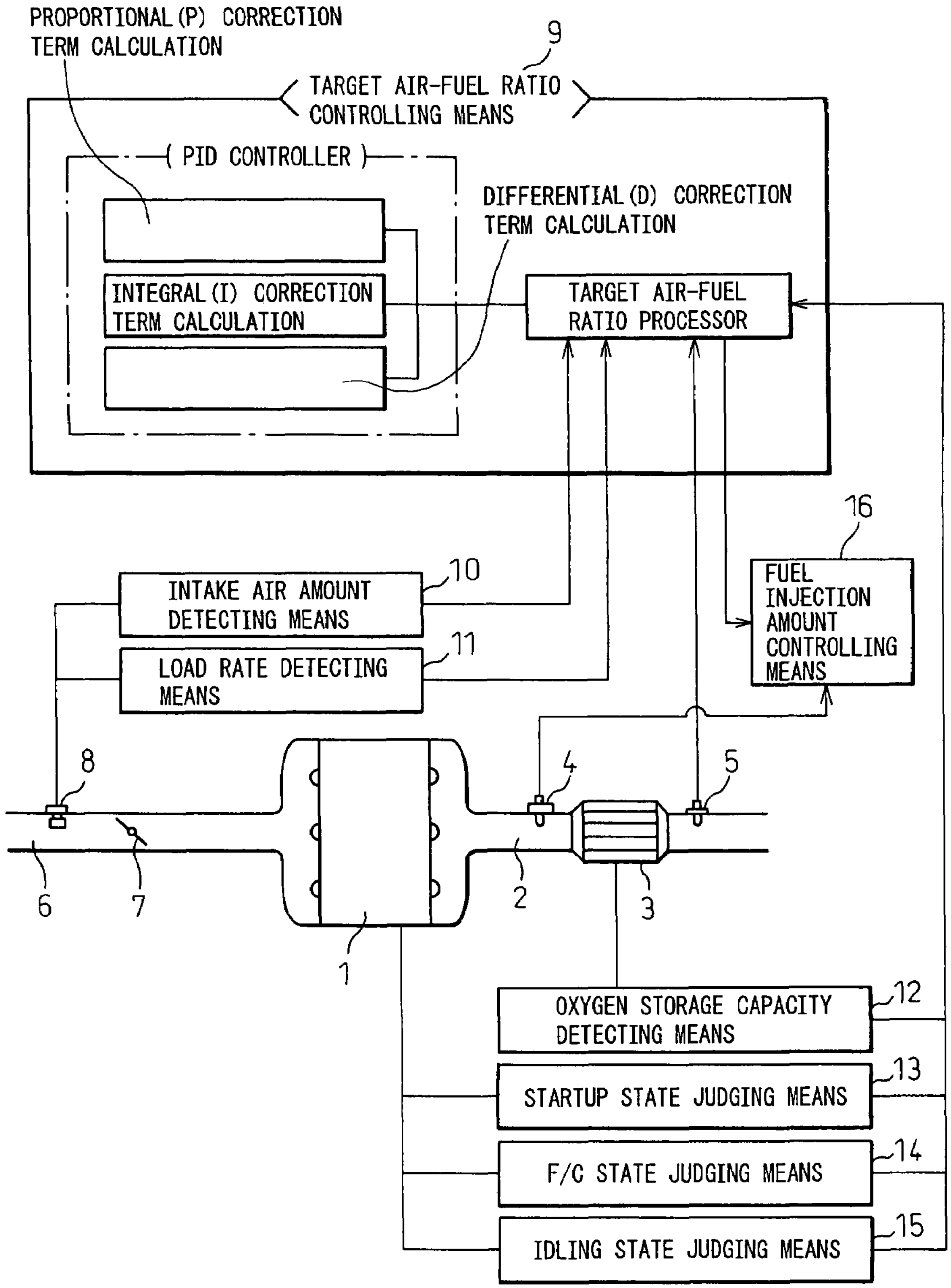
FIG. 1 is a schematic view of the configuration of an embodiment of an air-fuel ratio control system of an internal combustion engine of the present invention.

FIG. 1 is a schematic view of the configuration of an embodiment of an air-fuel ratio control system of an internal combustion engine of the present invention. In FIG. 1, 1 indicates an internal combustion engine body, 2 an exhaust pipe, 3 a three-way catalyst, 4 a linear air-fuel ratio sensor, 5 an oxygen sensor (hereinafter referred to as an "$O_2$ sensor"), 6 an intake pipe, 7 a throttle valve, 8 an air flow meter, 9 a target air-fuel ratio controlling means, 10 an intake air amount detecting means, 11 a load rate detecting means, 12 an oxygen storage capacity detecting means, 13 a startup state judging means, 14 a fuel cut state judging means (hereinafter referred to as an "F/C state judging means"), 15 an idling state judging means, and 16 a fuel injection amount controlling means.

The internal combustion engine body 1 has an exhaust pipe 2 in which a three-way catalyst 3 is arranged. At its upstream side, an upstream side air-fuel ratio sensor comprised of a linear air-fuel ratio sensor 4 is arranged, while at its downstream side, a downstream side air-fuel ratio sensor comprised of an $O_2$ sensor 5 is arranged.

The three-way catalyst 3 performs the role of purifying the NOx, HC, and CO by the maximum efficiency when the catalyst atmosphere is the stoichiometric air-fuel ratio. Further, the three-way catalyst 3 has added to it, as a secondary catalyst for promoting the oxygen storage capacity, for example ceria added to the catalyst carrier and has an oxygen storage capacity enabling it to store or release oxygen in accordance with the air-fuel ratio of the inflowing exhaust. Further, in the present embodiment, the exhaust purification catalyst arranged in the exhaust passage of the internal combustion engine body was made a three-way catalyst, but another exhaust purification catalyst having an oxygen storage capacity may also be used instead of a three-way catalyst.

The linear air-fuel ratio sensor 4 arranged at the upstream side of the three-way catalyst 3 is a sensor having an output characteristic substantially proportional to the air-fuel ratio of the exhaust, while the $O_2$ sensor 5 arranged at the downstream side of the three-way catalyst 3 is a sensor having the characteristic of detecting whether the air-fuel ratio of the exhaust is at the rich side or lean side from the stoichiometric air-fuel ratio.

The intake pipe 6 of the internal combustion engine body 1 has a throttle valve 7 and an air flow meter 8 for measuring the intake air amount adjusted by that throttle valve 7 arranged inside it. The air flow meter 8 performs the role of directly measuring the intake air amount, has a built-in potentiometer etc., and generates an output signal of an analog voltage proportional to the intake air amount.

The intake air amount detecting means 10 performs the role of detecting the amount of intake air to the internal combustion engine, while the load rate detecting means 11 performs the role of detecting the load rate of the internal combustion engine. In a specific embodiment, the intake air amount detecting means 10 and load rate detecting means 11 are comprised by the air flow meter 8, and the intake air amount and load rate are calculated based on the output information from the air flow meter 8.

Here, the load rate (KL) expresses the amount of fresh air charged into each cylinder of the internal combustion engine and is a parameter expressing the load of the internal combustion engine considering the engine speed. It for example is defined by the following equation:

$$KL(\%)=Mcair/((DSP/NCYL)\times\rho astd)\times 100 \quad \text{equation 1}$$

In equation 1, Mcair is the amount of fresh air charged into each cylinder when a suction valve opens, then closes, that is, the cylinder charging fresh air amount (g), DSP is the displacement of the engine (liters), NCYL is the number of cylinders, and ρastd is the air density at the standard state (1 atmosphere, 25° C.) (about 1.2 g/liter). When using such a load rate, the load rate detecting means 11 is comprised including an engine speed detecting means for detecting the engine speed.

The oxygen storage capacity detecting means 12 performs the role of detecting the maximum amount of oxygen which the three-way catalyst 3 can store, that is, the maximum oxygen storage amount. In a specific embodiment, the oxygen storage capacity detecting means 12 is configured including a linear air-fuel ratio sensor 4, $O_2$ sensor 5, and air flow meter 8. In this case, the maximum amount of oxygen which the three-way catalyst 3 can store is calculated based on the detection information of the linear air-fuel ratio sensor 4, $O_2$ sensor 5, and air flow meter 8. For example, the exhaust air-fuel ratio upstream of the three-way catalyst is used to calculate the rate of excess or shortage of oxygen in the exhaust, the amount of oxygen stored in the three-way catalyst 3 or the amount of oxygen released from it is learned from that oxygen excess rate and the intake air amount at that time, and this is integrated to calculate the maximum oxygen amount which the three-way catalyst 3 can stored.

The startup state judging means 13 performs the role of judging if the internal combustion engine is in the state immediately after startup. In a specific embodiment, the startup state judging means 13 has a startup state timer means for counting the duration after startup of the internal combustion engine and judging if the duration after startup of the internal combustion engine exceeds a predetermined time. When the startup state judging means 13 judges that the time elapsed after startup of the internal combustion engine has not reached the predetermined time, it judges that the internal combustion engine is in a state immediately after startup.

The F/C state judging means 14 performs the role of judging if the internal combustion engine has been in a fuel feed cut state for a long period of time. In a specific embodiment, the F/C state judging means 14 is configured by an F/C state timer means for detecting the duration of a state where feed of fuel to the internal combustion engine has been cut and the duration from when the cut of the feed of fuel to the internal combustion engine is suspended and the feed of fuel is restored. The F/C state judging means 14 judges that the internal combustion engine has been in a fuel feed cut state for a long period of time when the fuel feed cut state of the internal combustion engine has continued for a predetermined time or more or when the duration of the fuel feed after suspension of the fuel feed cut of the internal combustion engine has not reached a predetermined time.

The idling state judging means 15 performs the role of judging if the internal combustion engine is in an idling state. In a specific embodiment, the idling state judging means 15 is configured by an idling state timer means for detecting a duration of an idling state of an internal combustion engine and a duration from when normal operation was started after the end of idling of the internal combustion engine. The idling state judging means 15 judges that the internal combustion engine is in an idling state when the idling state of the internal combustion engine has continued for a predetermined time or more or when the duration of the normal operation after the end of the idling of the internal combustion engine has not reached a predetermined time.

The target air-fuel ratio controlling means 9 performs the role of performing suitable feedback control of the target air-fuel ratio of the exhaust flowing into the three-way catalyst 3 for maintaining the oxygen storage amount of the three-way catalyst 3 constant. The target air-fuel ratio controlling means 9 is provided with a PID control unit which calculates the feedback correction amounts for a proportional (P) correction term, integral (I) correction term, and differential (D) correction term in PID control and has a target air-fuel ratio processor calculating a target air-fuel ratio of exhaust flowing into the three-way catalyst 3. That target air-fuel ratio processor is configured to be able to fetch detection information or judgment information from the $O_2$ sensor 5, intake air amount detecting means 10, load rate detecting means 11, oxygen storage capacity detecting means 12, startup state judging means 13, F/C state judging means 14, and idling state judging means 15.

Further, the target air-fuel ratio processor has a first map for calculating a first correction coefficient to be multiplied with the proportional correction term and differential correction term dependent on the intake air amount when performing PID control and a second map for calculating a second correction coefficient to be multiplied with the integral correction term dependent on the load rate. Specifically, the first correction coefficient to be multiplied with the proportional correction term and differential correction term is set smaller the larger the intake air amount, while the second correction coefficient to be multiplied with the integral correction term is set proportional to the load rate. Further, the target air-fuel ratio processor may further have a third map for calculating a third correction coefficient to be multiplied with the proportional correction term and differential correction term dependent on the oxygen storage amount which the three-way catalyst stored, that is, the maximum oxygen storage amount. In this case, the proportional correction term and differential correction term are multiplied with the first correction coefficient calculated according to the above intake air amount and also the third correction coefficient set proportional to the maximum oxygen storage amount. Further, the above maps are kept stored in for example a memory etc.

The fuel injection amount controlling means 16 performs the role of performing feedback control of the fuel injection amount based on information of the linear air-fuel ratio sensor 4 so as to make the air-fuel ratio of the exhaust flowing into the three-way catalyst 3 the target air-fuel ratio controlled by the target air-fuel ratio controlling means 9 and is configured to be able to fetch the output information of the linear air-fuel ratio sensor 4 and the target air-fuel ratio information controlled by the target air-fuel ratio controlling means 9.

The actions and effects of an air-fuel ratio control system of an internal combustion engine of the embodiment shown in FIG. 1 having the above constituent elements will be explained below.

Figure 2:
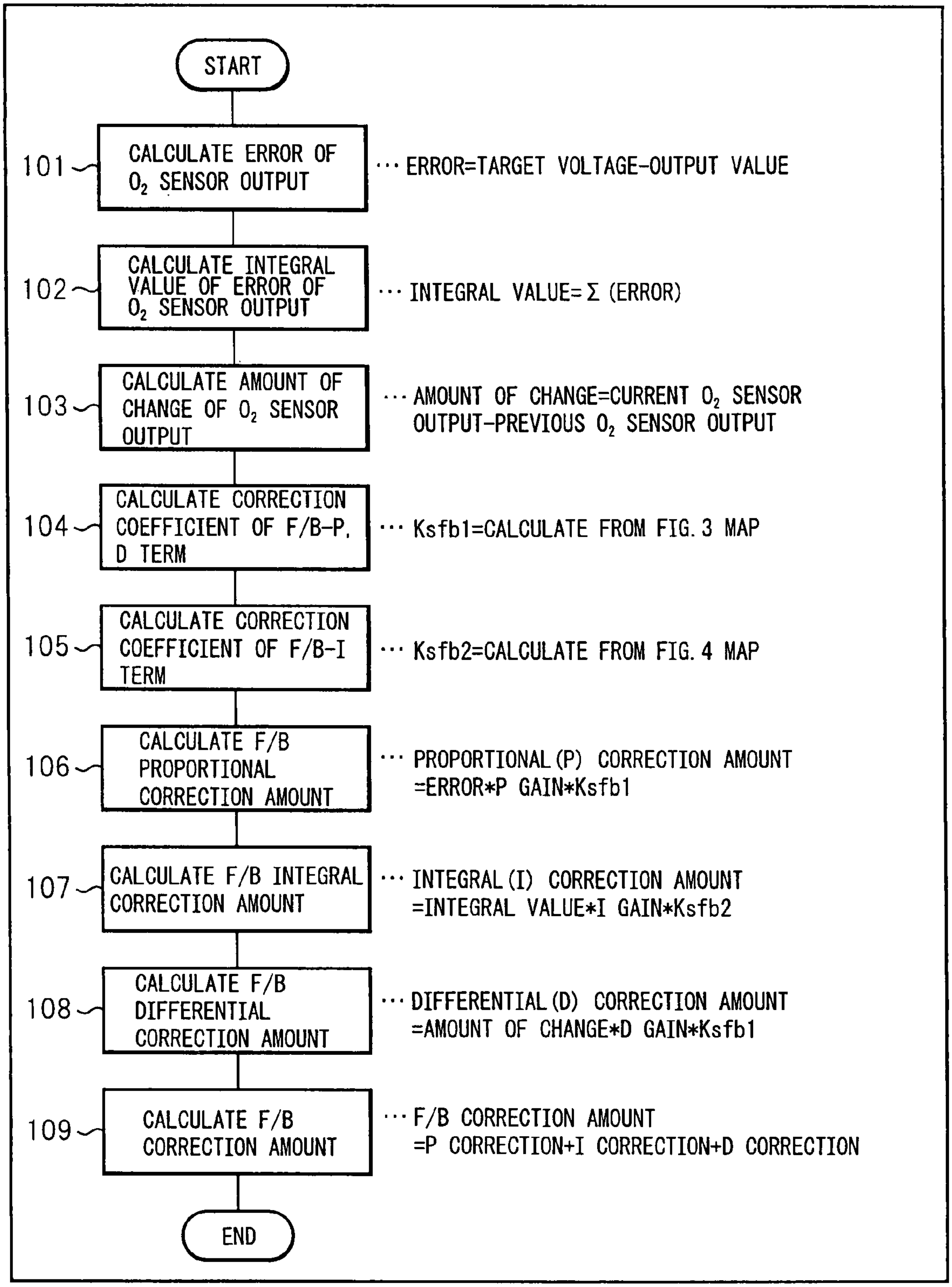
FIG. 2 is a flow chart showing a first embodiment of a control routine of PID control calculating a correction amount of feedback control of a target air-fuel ratio of exhaust flowing into a three-way catalyst 3 as executed in the internal combustion engine shown in FIG. 1 to which the present air-fuel ratio control system is applied.

FIG. 2 is a flow chart showing a first embodiment of a control routine of PID control calculating a correction amount of feedback control of a target air-fuel ratio of exhaust flowing into a three-way catalyst 3 as executed in the internal combustion engine shown in FIG. 1 to which the present air-fuel ratio control system is applied.

In the control routine shown in FIG. 2, first, based on the output information of the $O_2$ sensor 5, the target air-fuel ratio processor calculates the $O_2$ sensor output error, the integral value calculated by integrating that output error, and the amount of change of the $O_2$ sensor output. Next, so as to make the correction amount per unit time of the oxygen storage amount of the three-way catalyst 3 constant even if the intake air amount changes, that is, so as to optimally control the amount of oxygen stored in the three-way catalyst 3 or the amount of oxygen released from the three-way catalyst 3 per unit time to be constant, the correction coefficients to be multiplied with the proportional correction term, differential correction term, and integral correction term in the PID control are calculated from maps for calculation of those correction coefficients stored in the target air-fuel ratio processor based on the intake air amount and load rate of the internal combustion engine. Further, using the above calculated values and the predetermined proportional gain (hereinafter referred to as the "P gain"), integral gain (hereinafter referred to as the "I gain"), and differential gain (hereinafter referred to as the "D gain") set in PID control in advance by maps etc., the proportional (P) correction amount, integral (I) correction amount, and differential (D) correction amount are calculated. Based on these correction amounts, feedback control of a target air-fuel ratio of exhaust flowing into the three-way catalyst 3 is performed.

Below, details of the different steps will be explained.

First, at step 101 to step 103, the $O_2$ sensor output error, the integral value of that output error, and the amount of change of the $O_2$ sensor output are calculated. At step 101, the target air-fuel ratio processor of the target air-fuel ratio controlling means 9 calculates the error of the $O_2$ sensor output based on the output value of the $O_2$ sensor 5. Specifically, this is calculated by subtracting the actual $O_2$ sensor output value from a target voltage preset for the $O_2$ sensor 5 showing that the three-way catalyst atmosphere is in a desired air-fuel ratio state, for example, the stoichiometric air-fuel ratio state. At step 102, the target air-fuel ratio processor of the target air-fuel ratio controlling means 9 calculates the sum value of the error of the $O_2$ sensor output calculated at step 101, that is, the integral value. Specifically, this is calculated by integrating the error of the $O_2$ sensor output calculated at step 101. At step 103, the target air-fuel ratio processor of the target air-fuel ratio controlling means 9 calculates the amount of change of the $O_2$ sensor output based on the output value of the $O_2$ sensor 5. Specifically, this is calculated by subtracting from the output value of the $O_2$ sensor 5 the previous output value of the $O_2$ sensor 5.

Figure 3:
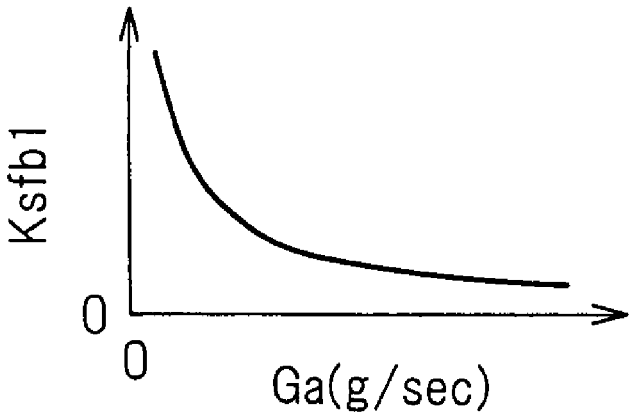
FIG. 3 is a view of an embodiment of a first map for calculating a first correction coefficient (Ksfb1) set depending on the intake air amount and to be multiplied with the proportional correction term and differential correction term in PID control by the target air-fuel ratio controlling means 9.
Figure 4:
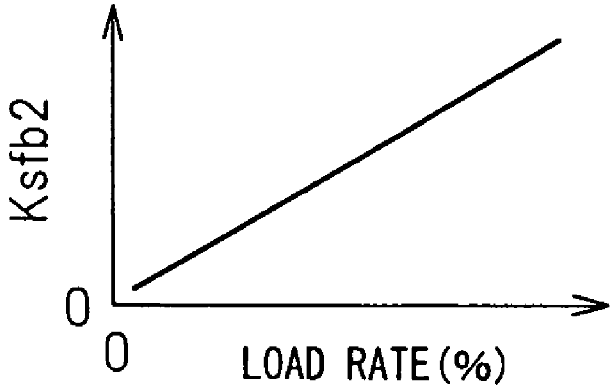
FIG. 4 is a view of an embodiment of a second map for calculating a second correction coefficient (Ksfb2) set depending on the load rate and to be multiplied with the integral correction term in PID control by the target air-fuel ratio controlling means 9.

Next, at step 104 to step 105, based on the intake air amount and load rate of the internal combustion engine, the correction coefficients to be multiplied with the proportional correction term, differential correction term, and integral correction term in PID control are calculated from maps for calculation of those correction coefficients stored in the target air-fuel ratio processor. FIG. 3 is a view of an embodiment of a first map for calculating a first correction coefficient (Ksfb1) set depending on the intake air amount and to be multiplied with the proportional correction term and differential correction term in PID control by the target air-fuel ratio controlling means 9. FIG. 4 is a view of an embodiment of a second map for calculating a second correction coefficient (Ksfb2) set depending on the load rate and to be multiplied with the integral correction term in PID control by the target air-fuel ratio controlling means 9.

At step 104, based on the detection information of the intake air amount detecting means 10, a first correction coefficient (Ksfb1) to be multiplied with the proportional correction term and differential correction term in PID control by the target air-fuel ratio controlling means 9 is calculated from a first map stored in the target air-fuel ratio processor (FIG. 3). As shown in FIG. 3, the first correction coefficient to be multiplied with the proportional correction term and differential correction term in that PID control is set smaller the larger the intake air amount.

In an air-fuel ratio control system where the oxygen storage amount of the three-way catalyst 3 is controlled to be constant by feedback control of the target air-fuel ratio of the exhaust flowing into a three-way catalyst 3 based on detection information of an $O_2$ sensor 5 and where the air-fuel ratio of the exhaust flowing into the three-way catalyst 3 is controlled to that target air-fuel ratio by feedback control of the fuel injection amount based on the output information of the linear air-fuel ratio sensor 4, even if the target air-fuel ratio of the exhaust flowing into the three-way catalyst 3 is made the same target air-fuel ratio value, if the intake air amount differs, the degree of $O_2$ stored in or released from the three-way catalyst 3 will differ. For example, if the target air-fuel ratio of the exhaust flowing into the three-way catalyst 3 is controlled to the lean side from the stoichiometric air-fuel ratio, the larger the intake air amount, the greater the amount of oxygen stored in the three-way catalyst 3 per unit time will be and the faster the amount of oxygen which the three-way catalyst 3 can store, that is, the maximum oxygen storage amount, will end up being reached. Therefore, even if the target air-fuel ratio of the exhaust flowing into the three-way catalyst 3 is made the same target air-fuel ratio value, the larger the intake air amount, the greater the oxygen storage amount per unit time with respect to the three-way catalyst will be, that is, the phenomenon will occur that there will be a large correction amount for the oxygen storage amount of the three-way catalyst 3 and the three-way catalyst atmosphere will easily end up greatly deviating from the purification window.

In the present air-fuel ratio control system, in PID control by the target air-fuel ratio controlling means 9, a first correction coefficient set smaller the larger the intake air amount is multiplied with the proportional correction term and differential correction term in the PID control so that the amount of oxygen stored in or the mount released by the three-way catalyst 3 per unit time can be made constant even if the intake air amount changes, that is, the correction amount of the oxygen storage amount of the three-way catalyst 3 per unit time can be made constant, the three-way catalyst atmosphere can be prevented from greatly deviating from the purification window, and the emission state can be improved.

At step 105, based on the detection information of the load rate detecting means 11, a second correction coefficient (Ksfb2) to be multiplied with the integral correction term in PID control by the target air-fuel ratio controlling means 9 is calculated from a second map stored in the target air-fuel ratio processor (FIG. 4). As shown in FIG. 4, the second correction coefficient to be multiplied with the integral correction term in that PID control is set proportional to the load rate so as to become larger the larger the load rate. The integral correction term in that PID control performs the role of correcting deviation of the air-fuel ratio of the exhaust flowing into the three-way catalyst 3 from the target air-fuel ratio calculated by the target air-fuel ratio controlling means 9, so by making a correction proportional to the load rate of the internal combustion engine, it is possible to maintain that target air-fuel ratio constant with a good precision.

At step 106 to step 108, the proportional (P) correction amount, integral (I) correction amount, and differential (D) correction amount are calculated based on the values calculated at step 101 to step 105 and the predetermined P gain, I gain, and D gain in PID control.

At step 106, the $O_2$ sensor output error calculated at step 101, the first correction coefficient (Ksfb1) calculated at step 104, and the P gain are multiplied to calculate the proportional correction amount in PID control by the target air-fuel ratio controlling means 9. At step 107, the integral value of the $O_2$ sensor output error calculated at step 102, the second correction coefficient (Ksfb2) calculated at step 105, and the I gain are multiplied to calculate the integral correction amount in PID control by the target air-fuel ratio controlling means 9. At step 108, the amount of change of the $O_2$ sensor output calculated at step 103, the first correction coefficient (Ksfb1) calculated at step 104, and the D gain are multiplied to calculate the differential correction amount in PID control by the target air-fuel ratio controlling means 9.

At the next step 109, the proportional correction amount, integral correction amount, and differential correction amount in PID control by the target air-fuel ratio controlling means 9 calculated at step 106 to step 108 are added so as to calculate the feedback correction amount and the series of steps of the control routine is ended.

Further, after the series of steps of the control routine shown in FIG. 2 is ended, the fuel injection amount controlling means 16 performs feedback control of the fuel injection amount based on the current air-fuel ratio information of the exhaust flowing into the three-way catalyst 3 detected by the linear air-fuel ratio sensor 4 so as to make the air-fuel ratio of the exhaust flowing into the three-way catalyst 3 the target air-fuel ratio controlled by feedback control based on the feedback correction amount calculated at step 109.

Figure 5:
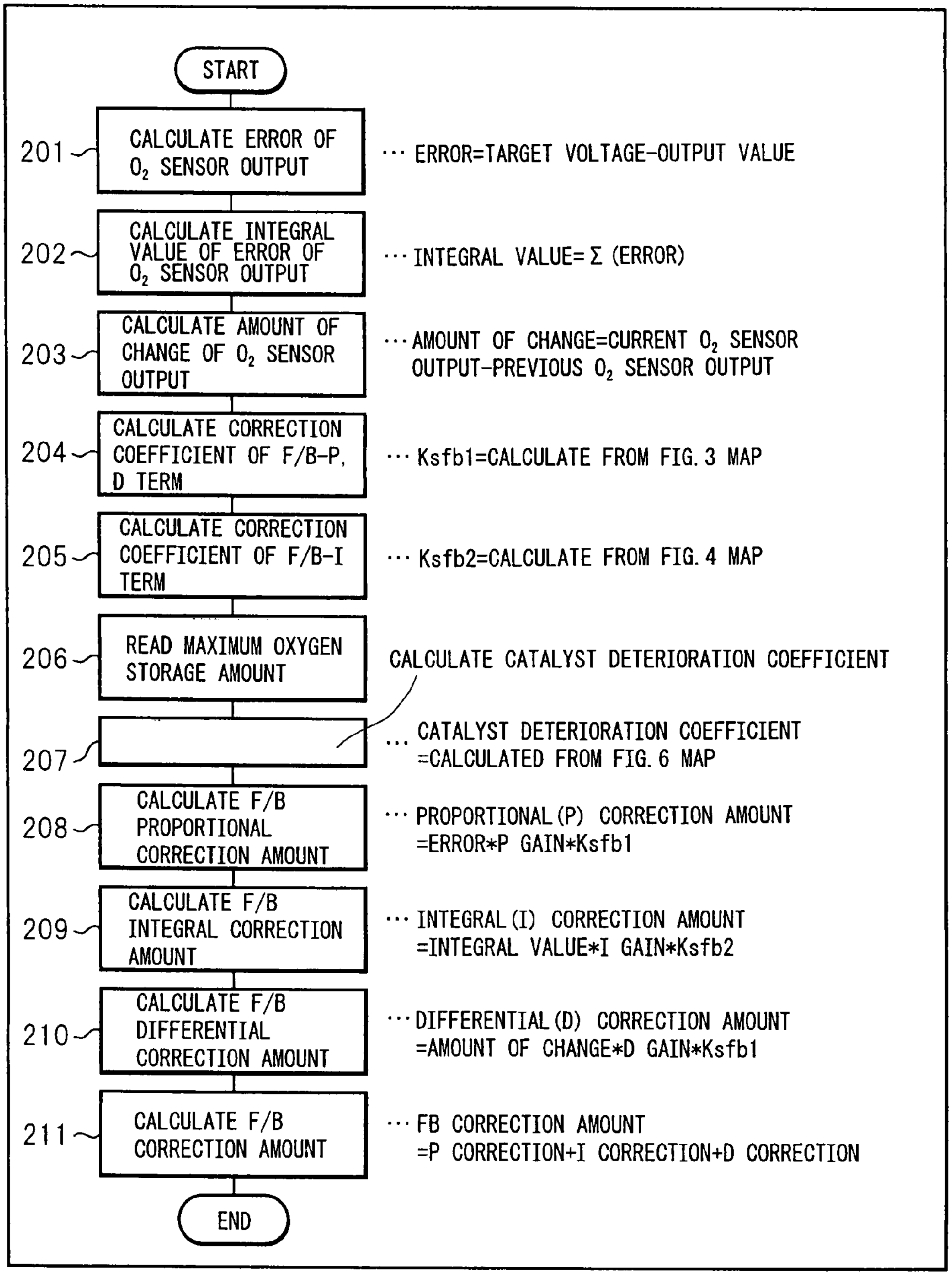
FIG. 5 is a flow chart showing a second embodiment of a control routine of PID control calculating a correction amount of feedback control of a target air-fuel ratio of exhaust flowing into a three-way catalyst 3 as executed in the internal combustion engine shown in FIG. 1 to which the present air-fuel ratio control system is applied.

FIG. 5 is a flow chart showing a second embodiment of a control routine of PID control calculating a correction amount of feedback control of a target air-fuel ratio of exhaust flowing into a three-way catalyst 3 as executed in the internal combustion engine shown in FIG. 1 to which the present air-fuel ratio control system is applied.

It is known that the maximum amount of oxygen which a three-way catalyst 3 can store, that is, the maximum oxygen storage amount, may deteriorate due to heat degradation of the three-way catalyst 3. Therefore, even if the target air-fuel ratio of the exhaust flowing into the three-way catalyst 3 is made the same target air-fuel ratio value and the intake air amount is the same, the greater the deterioration of the maximum oxygen storage amount of the three-way catalyst 3, the faster the allowable range of storage of oxygen in the three-way catalyst 3 will end up being reached and therefore the greater the possibility of the three-way catalyst atmosphere ending up greatly deviating from the purification window will become.

Based on this, in the control routine of the second embodiment shown in FIG. 5, considering the case where the three-way catalyst 3 is frequently exposed to a usage environment where the maximum oxygen storage amount of the three-way catalyst 3 will deteriorate or drop, the control routine shown in FIG. 2 is further given as a parameter a third correction coefficient calculated proportional to the maximum oxygen storage amount of the three-way catalyst 3 when calculating the proportional correction amount and differential correction amount in PID control by the target air-fuel ratio controlling means 9. Due to this, the smaller the maximum oxygen storage amount of the three-way catalyst 3, the smaller the oxygen storage amount or oxygen release amount of the three-way catalyst 3 per unit time can be controlled to, the three-way catalyst atmosphere can be prevented from greatly deviating from the purification window even if the maximum oxygen storage amount of the three-way catalyst 3 deteriorates or drops, and the emission state can be improved.

Below, details of the steps will be explained.

In the control routine of the second embodiment shown in FIG. 5, at step 201 to step 205, the $O_2$ sensor output error, the integral value calculated by integrating the $O_2$ sensor output error, the amount of change of the $O_2$ sensor output, the first correction coefficient (Ksfb1) dependent on the intake air amount, and the second correction coefficient (Ksfb2) dependent on the load rate are calculated. The content of these steps are similar to step 101 to step 105 of the control routine of the first embodiment shown in FIG. 2, so their explanations will be omitted.

Figure 6:
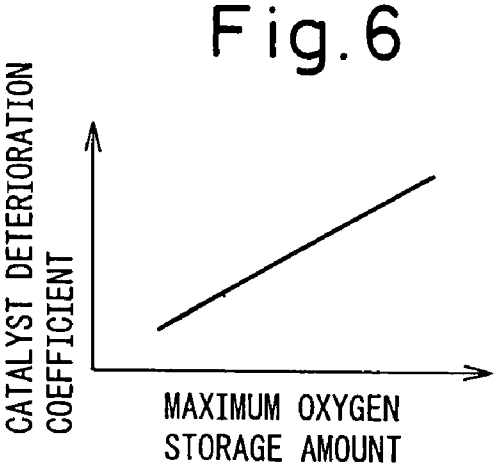
FIG. 6 is a view of an embodiment of a third map for calculating a third correction coefficient (catalyst deterioration coefficient) set depending on the maximum oxygen storage amount and to be multiplied with the proportional correction term and differential correction term in PID control by the target air-fuel ratio controlling means 9.

At step 206, the maximum oxygen storage amount of the three-way catalyst 3 detected by an oxygen storage capacity detecting means 12 is fetched into the target air-fuel ratio processor of the target air-fuel ratio controlling means 9. At the next step 207, a third correction coefficient (catalyst deterioration coefficient) for multiplication with the proportional correction term and differential correction term in PID control by the target air-fuel ratio controlling means 9 is calculated based on detection information of the maximum oxygen storage amount of the three-way catalyst 3 detected at step 206 from a third map stored in the target air-fuel ratio processor (FIG. 6). FIG. 6 is a view of an embodiment of a third map for calculating a third correction coefficient (catalyst deterioration coefficient) set depending on the maximum oxygen storage amount and to be multiplied with the proportional correction term and differential correction term in PID control by the target air-fuel ratio controlling means 9. As shown in FIG. 6, the third correction coefficient to be multiplied with the proportional correction term and differential correction term in that PID control is set proportional to the maximum oxygen storage amount so as to become larger the larger the maximum oxygen storage amount. Due to this, control may be performed so that the smaller the maximum oxygen storage amount of a three-way catalyst 3, the smaller the oxygen storage amount or oxygen release amount of the three-way catalyst 3 per unit time is made, the three-way catalyst atmosphere can be prevented from greatly deviating from the purification window even if the maximum oxygen storage amount of the three-way catalyst 3 deteriorates or drops, and the emission state can be improved.

At step 208 to step 210, the proportional correction amount, integral correction amount and differential correction amount are calculated based on the values calculated at step 201 to step 207 and the predetermined P gain, I gain, and D gain in PID control.

At step 208, the $O_2$ sensor output error calculated at step 201, the first correction coefficient (Ksfb1) calculated at step 204, the third correction coefficient (catalyst deterioration coefficient) calculated at step 207, and the P gain are multiplied to calculate the proportional correction amount in PID control by the target air-fuel ratio controlling means 9. At step 209, the integral value of the $O_2$ sensor output error calculated at step 202, the second correction coefficient (Ksfb2) calculated at step 205, and the I gain are multiplied to calculate the integral correction amount in the PID control by the target air-fuel ratio controlling means 9. At step 210, the amount of change of the $O_2$ sensor output calculated at step 203, the first correction coefficient (Ksfb1) calculated at step 204, the third correction coefficient (catalyst deterioration coefficient) calculated at step 207, and the D gain are multiplied to calculate the differential correction amount in PID control by the target air-fuel ratio controlling means 9.

At the next step 211, the proportional correction amount, integral correction amount, and differential correction amount in PID control by the target air-fuel ratio controlling means 9 calculated at step 208 to step 210 are added to calculate the feedback correction amount, then the series of steps of the control routine is ended.

Further, after the series of steps of the control routine shown in FIG. 5 ends, the fuel injection amount controlling means 16 performs feedback control of the fuel injection amount based on the current air-fuel ratio information of the exhaust flowing into the three-way catalyst 3 detected by the linear air-fuel ratio sensor 4 so as to make the air-fuel ratio of the exhaust flowing into the three-way catalyst 3 the target air-fuel ratio controlled by feedback control based on the feedback correction amount calculated at step 211.

According to the control routine of the first embodiment of PID control and the control routine of the second embodiment calculating the correction amount of feedback control of a target air-fuel ratio of exhaust flowing into a three-way catalyst 3 as executed in an internal combustion engine to which the present air-fuel ratio control system is applied, explained with reference to FIG. 2 to FIG. 6, the correction amount per unit time of the oxygen storage amount of the three-way catalyst 3 can be made constant, that is, the amount of oxygen stored in or the amount released from the three-way catalyst 3 per unit time can be made constant, even if the intake air amount changes, the three-way catalyst atmosphere can be prevented from greatly deviating from the purification window, and the emission state can be improved.

Incidentally, when feedback control multiplying a first correction coefficient set smaller the larger the intake air amount (Ksfb1) with the proportional correction term and differential correction term in PID control by the target air-fuel ratio controlling means 9 so as to calculate the feedback correction amount so as to make the amount of oxygen stored in or the amount released from the three-way catalyst 3 per unit time constant even if the intake air amount changes is applied immediately after startup of the internal combustion engine, after restoration from a fuel cut extending over a long period, or in an idling state extending over a long period, excessive hunting may occur and deterioration of the emission state or drivability may be caused.

A state immediately after startup of the internal combustion engine, after restoration from a long fuel feed cut, or after a long idling is a state of continuation of a state with a small intake air amount, that is, a step where the three-way catalyst temperature easily falls. In an environment where the three-way catalyst temperature easily falls, it is known that the maximum oxygen storage amount of the three-way catalyst 3 falls. Therefore, in such a state, control is required for reducing the amount of oxygen stored in or the amount of oxygen released from the three-way catalyst 3 per unit time. However, the state immediately after startup of the internal combustion engine, after restoration from a long fuel feed cut, or after a long idling is also a state where the intake air amount is small, so the first correction coefficient set smaller the larger the intake air amount, that is, when PID control where a first correction coefficient set larger the smaller the intake air amount is multiplied with the proportional correction term and differential correction term is executed, control ends up being performed so as to increase the oxygen storage amount or oxygen release amount with respect to the three-way catalyst 3 per unit time, so excessive hunting may occur and the emission state or drivability may be degraded.

Based on this, a control routine prohibiting multiplication of the first correction coefficient (Ksfb1) set depending on the intake air amount with the proportional correction term and differential correction term in PID control by the target air-fuel ratio controlling means 9 immediately after startup of the internal combustion engine, after restoration from a fuel cut extending over a long period, or in an idling state extending over a long period may be further added to the control routines shown in FIG. 2 and FIG. 5.

Figure 7:
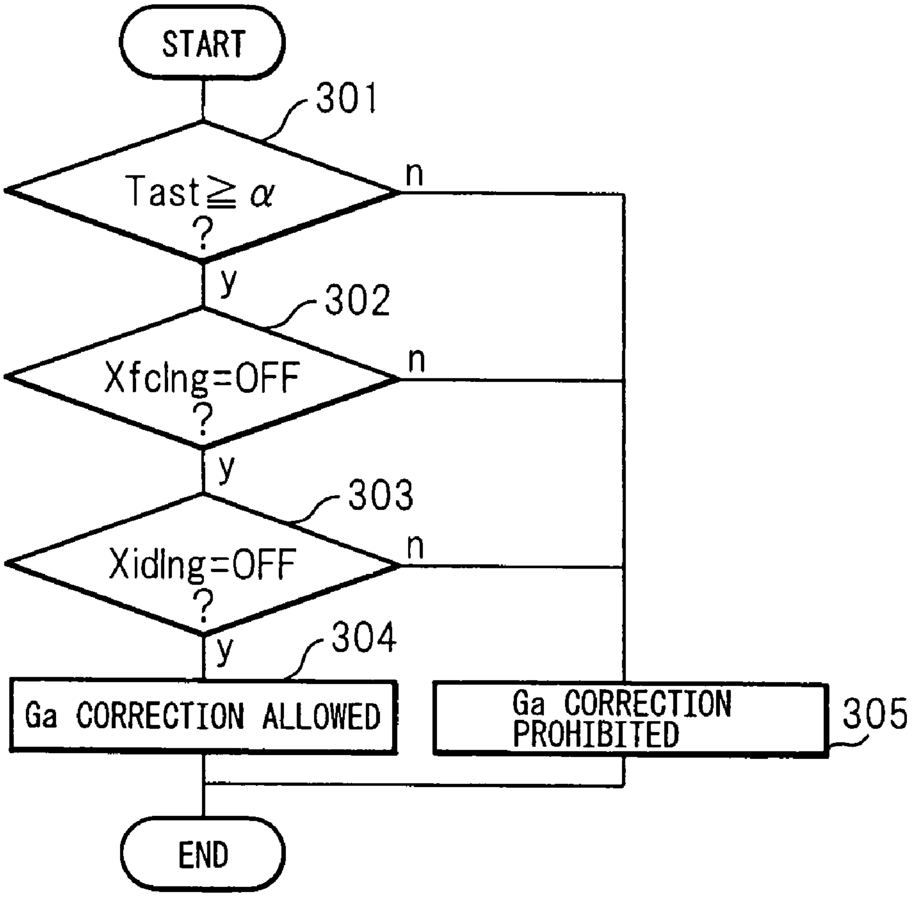
FIG. 7 is a view of an embodiment of a control routine for prohibiting multiplication with the first correction coefficient (Ksfb1) set depending on the intake air amount.

FIG. 7 is a view of an embodiment of a control routine for prohibiting multiplication with the first correction coefficient (Ksfb1) set depending on the intake air amount under predetermined conditions. In the control routine shown in FIG. 7, it is judged by the startup state judging means 13, F/C state judging means 14, and idling state judging means 15 if the state is immediately after startup of the internal combustion engine, after restoration from a fuel cut extending over a long period, or in an idling state extending over a long period and it is judged whether to allow or prohibit correction by multiplication with a first correction coefficient (Ksfb1) set depending on the intake air amount (hereinafter referred to as the "Ga correction").

Below, details of the steps will be explained.

At step 301, the count of the post-startup time (Tast) by the startup state timer means of the startup state judging means 13 is calculated, that is, the duration after startup of the internal combustion engine is counted, and it is judged if the duration after startup of the internal combustion engine is over the judgment value (α) for allowing Ga correction after startup. When it is judged that the duration after startup of the internal combustion engine is not over the judgment value (α) for allowing Ga correction after startup, the routine proceeds to step 305 where Ga correction is prohibited. When it is judged that the duration after startup of the internal combustion engine is over the judgment value (α) for allowing Ga correction after startup, the routine proceeds to the next step 302.

At step 302, it is judged by the F/C state judging means 14 if the Ga correction prohibit flag (Xfclng) is ON/OFF. When it is judged that the Ga correction prohibit flag is ON, the routine proceeds to step 305 where Ga correction is prohibited. When it is judged that the Ga correction prohibit flag is OFF, the routine proceeds to step 303.

At step 303, it is judged by the idling state judging means 15 if the Ga correction prohibit flag (Xidlng) is ON/OFF. When it is judged that the Ga correction prohibit flag is ON, the routine proceeds to step 305 where Ga correction is prohibited. When it is judged that the Ga correction prohibit flag is OFF, the routine proceeds to step 304 where Ga correction is allowed and the series of steps of the control routine is ended. Further, in the embodiment shown in FIG. 7, Ga correction is allowed when all of the conditions of the state immediately after startup of the internal combustion engine, the state after restoration from a fuel cut extending over a long period, and an idling state extending over a long period satisfy the conditions for allowance of Ga correction, but the control routine may also be configured so that Ga correction is allowed when the conditions of any one or any two states among these three states are satisfied.

Figure 8:
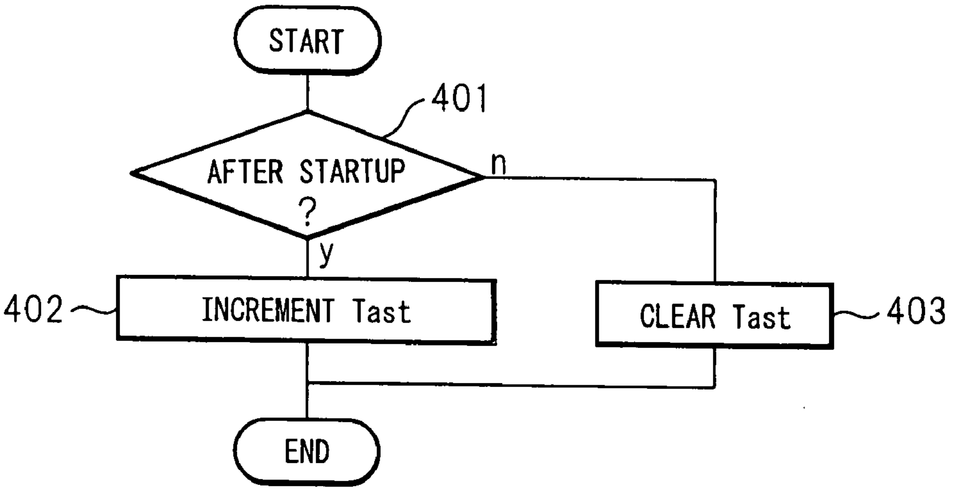
FIG. 8 is a view of an embodiment of a control routine for counting a post-startup time (Tast) at step 301 of the control routine shown in FIG. 7, that is, for counting the duration after start of the internal combustion engine.

FIG. 8 is a view of an embodiment of a control routine for counting a post-startup time (Tast) at step 301 of the control routine shown in FIG. 7, that is, for counting the duration after start of the internal combustion engine. In the control routine shown in FIG. 8, it is judged by the startup state judging means 13 at step 401 whether the internal combustion engine is in a state after startup. If it is judged that it is after startup, the routine proceeds to step 402 where the duration after startup is counted, while if it is judged that it is not after startup, the routine proceeds to step 403 where the count duration is cleared.

Figure 9:
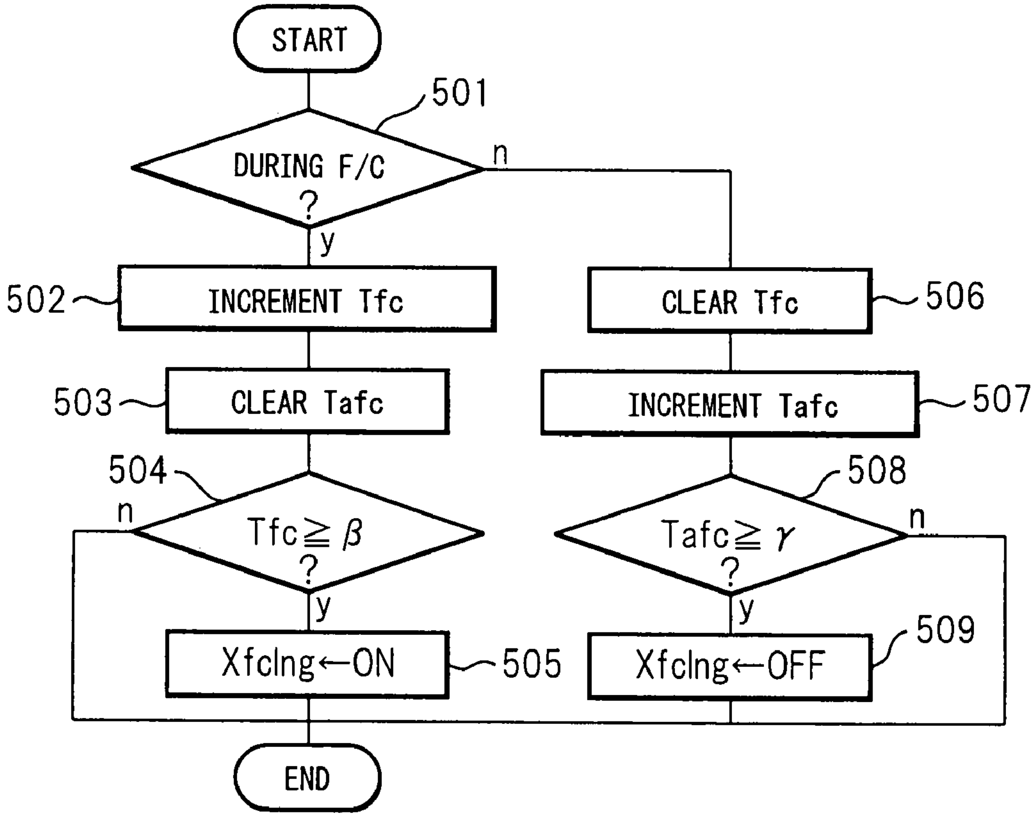
FIG. 9 is a view of an embodiment of a control routine for judgment of an ON/OFF state of a Ga correction prohibit flag (Xfclng) by an F/C state judging means 14 at step 302 of the control routine shown in FIG. 7.

FIG. 9 is a view of an embodiment of a control routine for judgment of an ON/OFF state of a Ga correction prohibit flag (Xfclng) by an F/C state judging means 14 at step 302 of the control routine shown in FIG. 7. In the control routine shown in FIG. 9, at step 501, it is judged if the internal combustion engine is in the middle of a fuel feed cut (F/C). If it is judged at step 501 that it is in the middle of a fuel feed cut, the routine proceeds to step 502 and step 503 where the count of the fuel feed cut duration (Tfc) is incremented, that is, the fuel feed cut duration is counted, the count of the time after restoration from a fuel feed cut (Tafc) is cleared, and the routine proceeds to the next step 504. At step 504, it is judged if the fuel feed cut duration has exceeded the prohibition judgment value (β) prohibiting Ga correction. If it is judged that the fuel feed cut duration has exceeded the prohibition judgment value (β) prohibiting Ga correction, the routine proceeds to step 505 where the Ga correction prohibit flag is set ON and Ga correction is prohibited. If it is judged at step 501 that the engine is not in the middle of a fuel feed cut, the routine proceeds to step 506 and step 507 where the count of the fuel feed cut duration (Tfc) is cleared, the count of the time after restoration from a fuel feed cut (Tafc) is incremented, that is, the time after restoration from a fuel feed cut is counted, and the routine proceeds to the next step 508. At step 508, it is judged if the count of the time after restoration from a fuel feed cut has exceeded an allowance judgment value (γ) allowing Ga correction. If it is judged that the count of the time after restoration from a fuel feed cut has exceeded the allowance judgment value (γ) allowing Ga correction, the routine proceeds to step 509 where the Ga correction prohibit flag is set OFF and Ga correction is allowed.

Figure 10:
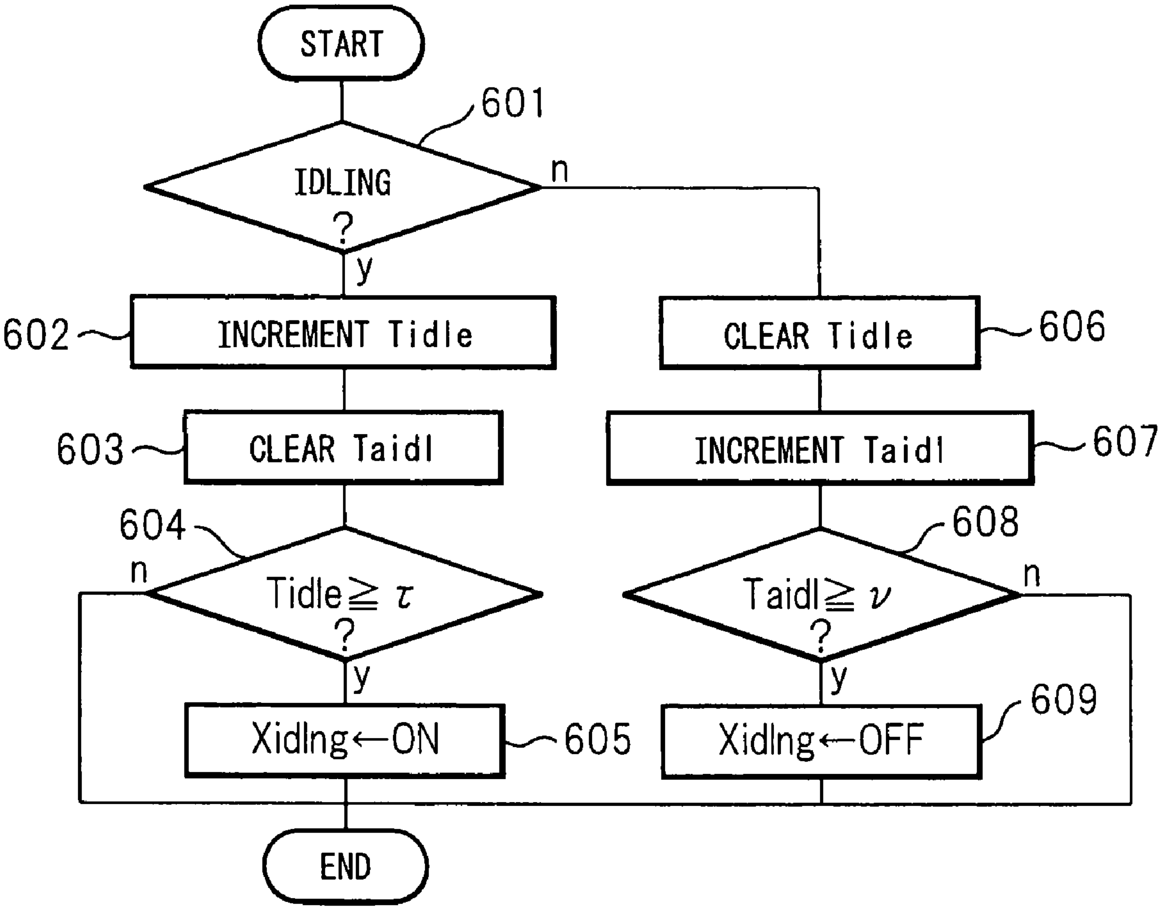
FIG. 10 is a view of an embodiment of a control routine for judgment of an ON/OFF state of a Ga correction prohibit flag (Xidlng) by an idling state judging means 15 at step 303 of the control routine shown in FIG. 7.

FIG. 10 is a view of an embodiment of a control routine for judgment of an ON/OFF state of a Ga correction prohibit flag (Xidlng) by an idling state judging means 15 at step 303 of the control routine shown in FIG. 7. In the control routine shown in FIG. 10, at step 601, it is judged if the internal combustion engine is in the middle of idling. If it is judged at step 601 that it is in the middle of idling, the routine proceeds to step 602 and step 603 where the count of the duration of the idling (Tidle) is incremented, that, the duration of the idling is counted, the count of the time after the end of the idling (Taidle) is cleared, and the routine proceeds to the next step 604. At step 604, it is judged if the count of the duration of the idling has exceeded the prohibition judgment value (τ) prohibiting Ga correction. If it is judged if the idling continuation count has exceeded the prohibition judgment value (τ) prohibiting Ga correction, the routine proceeds to step 605 where the Ga correction prohibit flag is set ON and Ga correction is prohibited. If it is judged at step 601 that the engine is not in the middle of idling, the routine proceeds to step 606 and step 607 where the idling continuation count (Tidle) is cleared, further, the time count after the end of the idling (Taidle) is incremented, that is, the time after the end of the idling is counted, then the routine proceeds to the next step 608. At step 608, it is judged if the duration of the normal operation state after the end of the idling has exceeded the allowance judgment value (υ) allowing Ga correction. If it is judged that the duration of the normal operation state after the end of idling exceeds the allowance judgment value (υ) allowing Ga correction, the routine proceeds to step 609 where the Ga correction prohibit flag is turned OFF and Ga correction is allowed.

Further, referring to FIG. 2 and FIG. 5, embodiments of two control routines of PID control calculating the correction amount of feedback control of a target air-fuel ratio of exhaust flowing into the three-way catalyst 3 as executed in an internal combustion engine shown in FIG. 1 to which the present air-fuel ratio control system is applied were shown, but the object of the present invention of making the correction amount per unit time of the oxygen storage amount of an exhaust purification catalyst such as a three-way catalyst having an oxygen storage capacity constant even if the intake air amount changes can be achieved even in PI control without D control. For the correction amount of feedback control of a target air-fuel ratio of exhaust flowing into the three-way catalyst 3, the correction amount calculated by PI control may be applied. In that case, the step relating to the differential (D) correction term is not necessary from the control routine referring to FIG. 2 and FIG. 5.

Further, in the embodiments of the two control routines of PID control shown in FIG. 2 and FIG. 5 calculating the correction amount of feedback control of the target air-fuel ratio of exhaust flowing into the three-way catalyst 3, considering the fact that the amount of fresh air charged into each cylinder when the suction valve opens, then closes changes depending on both the intake air amount and also the engine speed or number of cylinders etc., the integral correction term was multiplied with a correction coefficient set larger the larger the load rate expressing the amount of fresh air charged into each cylinder when the suction valve opens, then closes so as to enable more precise feedback control of the target air-fuel ratio. However, the object of the present invention of making the correction amount per unit time of the oxygen storage amount of an exhaust purification catalyst such as a three-way catalyst having an oxygen storage capacity constant even if the intake air amount changes can be achieved, instead of by multiplying the integral correction term with a correction coefficient dependent on the load rate, by multiplication with a correction coefficient set larger the larger the intake air amount. As the correction coefficient for the integral correction term, a correction coefficient dependent on the intake air amount can also be applied. In that case, in the control routine referred to in FIG. 2 and FIG. 5, instead of the correction coefficient set larger the larger the load rate, a correction coefficient set larger the larger the intake air amount is multiplied with the integral (I) correction term and the load rate detecting means 11 becomes unnecessary.

Figure 11:
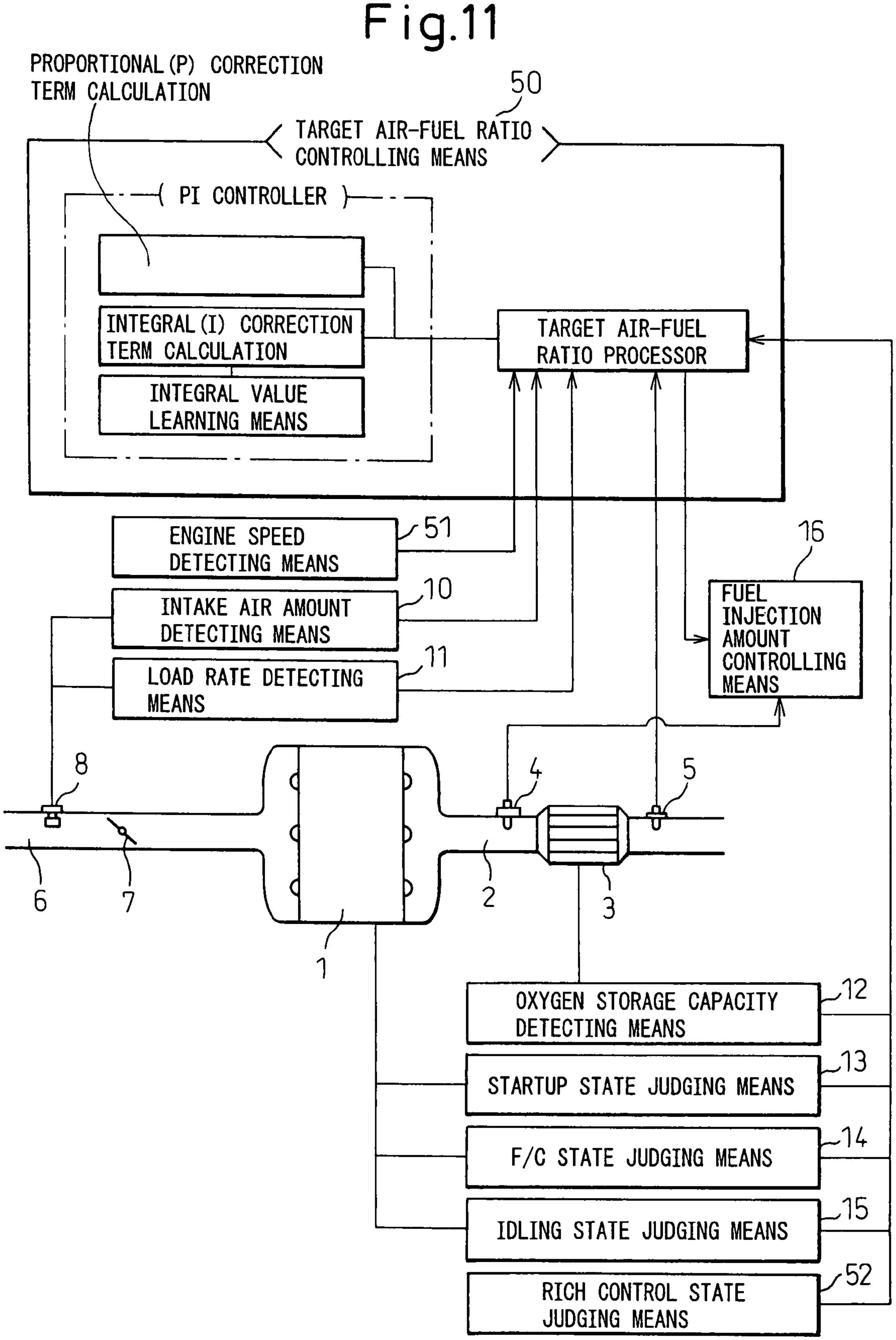
FIG. 11 is a schematic view showing another embodiment of an air-fuel ratio control system of an internal combustion engine of the present invention.

FIG. 11 is a schematic view showing another embodiment of an air-fuel ratio control system of an internal combustion engine of the present invention. The components in FIG. 11 are substantially the same as the air-fuel ratio control system shown in FIG. 1. The same or corresponding parts are assigned the same reference notations. Components different from the air-fuel ratio control system shown in FIG. 1 are explained below.

Figure 16:
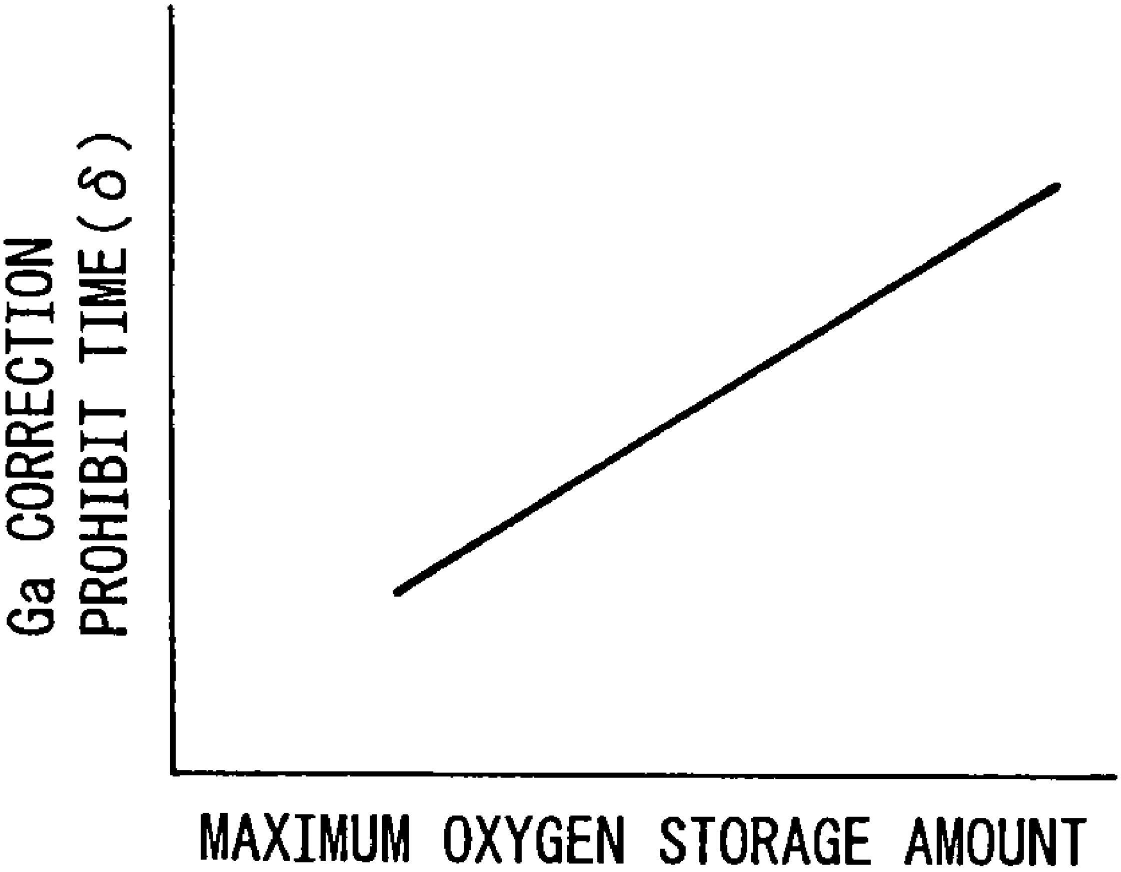
FIG. 16 is a view of a fifth map for calculating a Ga correction prohibit time set depending on the maximum oxygen storage amount of a three-way catalyst 3 and used when rich control is executed at the time of natural restoration from a fuel feed cut.

The target air-fuel ratio processor of the target air-fuel ratio controlling means 50 shown in FIG. 11 is configured by a PI control unit without a D control unit and has a fourth map for calculating a fourth correction coefficient (ksfb4) to be multiplied with the integral correction term dependent on the engine speed (FIG. 13) and a first map for calculating a first correction coefficient to be multiplied with the proportional correction term dependent on the intake air amount in the same way as the embodiment of FIG. 1 (FIG. 3). The fourth correction coefficient to be multiplied with the integral correction term is specifically set smaller the larger the engine speed. Further, the target air-fuel ratio controlling means 50 has an integral value learning means for learning control of the integral value calculated by integrating error of the $O_2$ sensor output. Further, the air-fuel ratio control system has an engine speed detecting means 51 for detecting the engine speed and a rich control state judging means 52. That rich control state judging means 52 performs the role of judging, based on the changes in the fuel injection state, engine speed, and oxygen storage amount of the exhaust purification catalyst etc., if the system is in a rich control state making the air-fuel ratio of the exhaust purification catalyst atmosphere a rich air-fuel ratio at the time of restoration from a fuel feed cut for quickly restoring the purification action of the exhaust purification catalyst, which had dropped due to the fuel feed cut, to a suitable state and if that rich control state is a rich control state at the time of natural restoration from a fuel feed cut in which the fuel feed cut is continued until the idling state where the intake air amount is extremely small (idling state), then the normal feed is restored. Further, the target air-fuel ratio processor of the target air-fuel ratio controlling means 50 has a fifth map for calculating the predetermined time for prohibiting correction by multiplication of the first correction coefficient set depending on the intake air with the proportional correction term, at the time when the above rich control is executed at the time of natural restoration from the above fuel feed cut, based on the maximum oxygen storage amount of the exhaust purification catalyst (FIG. 16).

Figure 12:
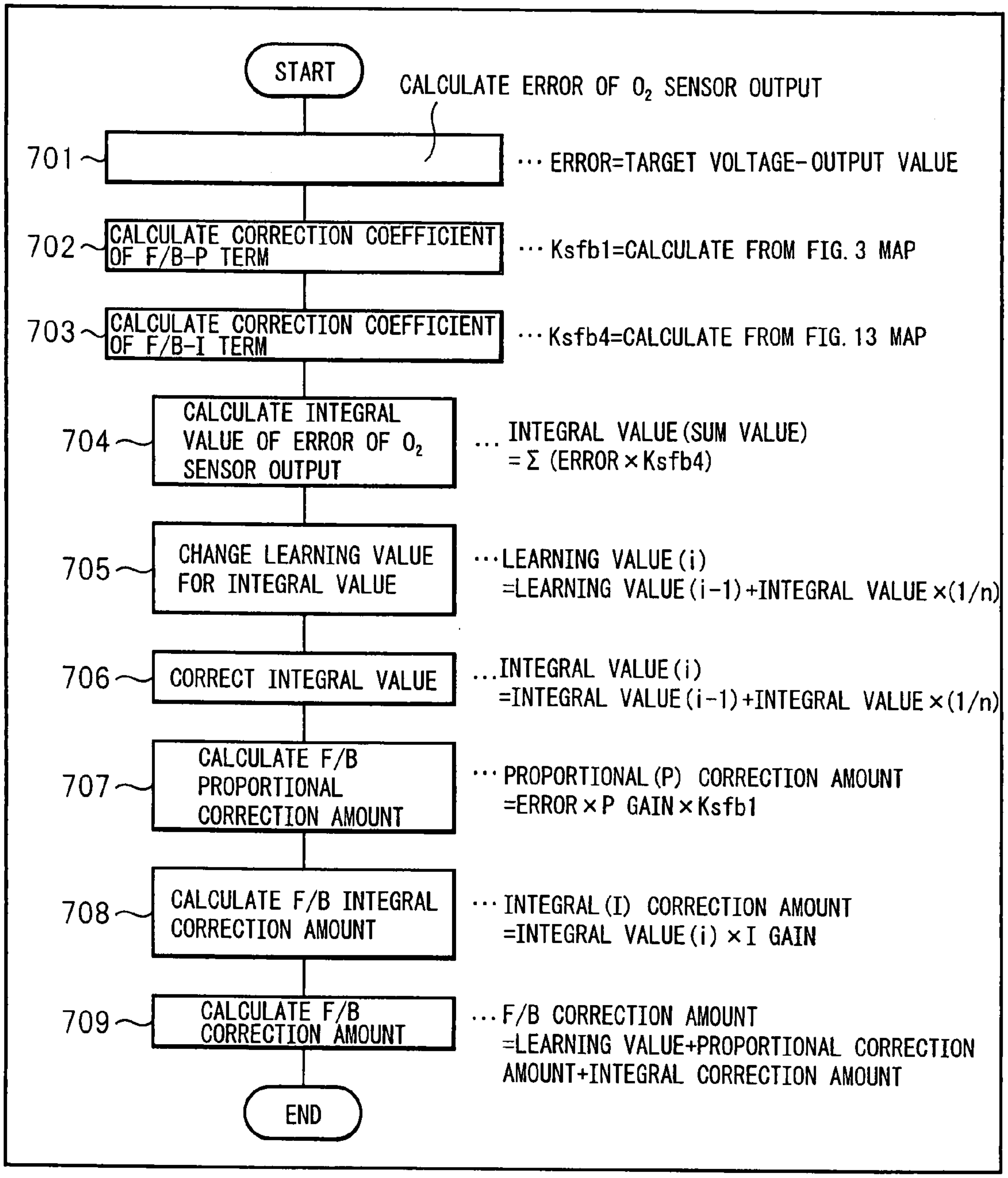
FIG. 12 is a flow chart showing a third embodiment of a control routine calculating a correction amount of feedback control of a target air-fuel ratio of exhaust flowing into a three-way catalyst 3 as executed in the internal combustion engine shown in FIG. 11 to which the present air-fuel ratio control system is applied.

FIG. 12 is a flow chart showing a third embodiment of a control routine calculating a correction amount of feedback control of a target air-fuel ratio of exhaust flowing into a three-way catalyst 3 as executed in the internal combustion engine shown in FIG. 11 to which the present air-fuel ratio control system is applied. Further, in the control routine of the third embodiment shown in FIG. 12, PI control without D control is used to calculate the correction amount of feedback control of a target air-fuel ratio of exhaust flowing into the three-way catalyst 3.

The timing of the processing for calculation of the correction amount in feedback control of a target air-fuel ratio may be set by various possible methods, but performing the processing for calculation of the correction amount feedback control of a target air-fuel ratio by a processing routine synchronized with each fuel injection may be considered one method. In calculation of the correction amount of an integral correction term in feedback control of a target air-fuel ratio, the integration for integrating the $O_2$ sensor output error to calculate the integrated value, that is, the integral value, is executed for every processing routine. If the processing for calculation of the correction amount of the integral correction term in feedback control of a target air-fuel ratio is executed by a processing routine synchronized with each fuel injection, the $O_2$ sensor output error is added with each fuel injection. This causes differences in the integral value calculated by integrating the $O_2$ sensor output error per unit time based on the engine speed and causes differences in the correction amount of the integral correction term per unit time. For example, the higher the engine speed, the greater the number of fuel injections per unit time, the greater the number of integration operations per unit time, and the greater the correction amount of the integral correction term per unit time. The fluctuations in the correction amount of the integral correction term caused by such fluctuation of the engine speed causes excessive integration of the $O_2$ sensor output error depending on the operation state of the internal combustion engine, has a large effect on the control for making the correction amount per unit time of the oxygen storage amount of an exhaust purification catalyst having an oxygen storage capacity constant, and may cause deterioration of the exhaust emission.

Based on this, in the control routine of the third embodiment shown in FIG. 12, considering the effect of the engine speed in calculation of the correction amount of the integral correction term when processing for calculation of the correction amount of the integral correction term in feedback control of a target air-fuel ratio is executed by a processing routine synchronized with each fuel injection, a fourth correction coefficient set smaller the larger the engine speed is added as a parameter when calculating the integral correction amount in feedback control of the target air-fuel ratio. Due to this, it is possible to suppress the effect of the engine speed on control for making the correction amount per unit time of the oxygen storage amount of an exhaust purification catalyst having an oxygen storage capacity constant and possible to prevent deterioration of the exhaust emission.

Below, details of the steps will be explained.

First, at step 701, a target air-fuel ratio processor of the target air-fuel ratio controlling means 50 calculates the error of the $O_2$ sensor output based on the output value of the $O_2$ sensor. Specifically, it calculates this by subtracting from a target voltage preset for the $O_2$ sensor 5 showing that the three-way catalyst atmosphere is at the desired air-fuel ratio state, for example, the stoichiometric air-fuel ratio state, the actual output value of the $O_2$ sensor output.

Figure 13:
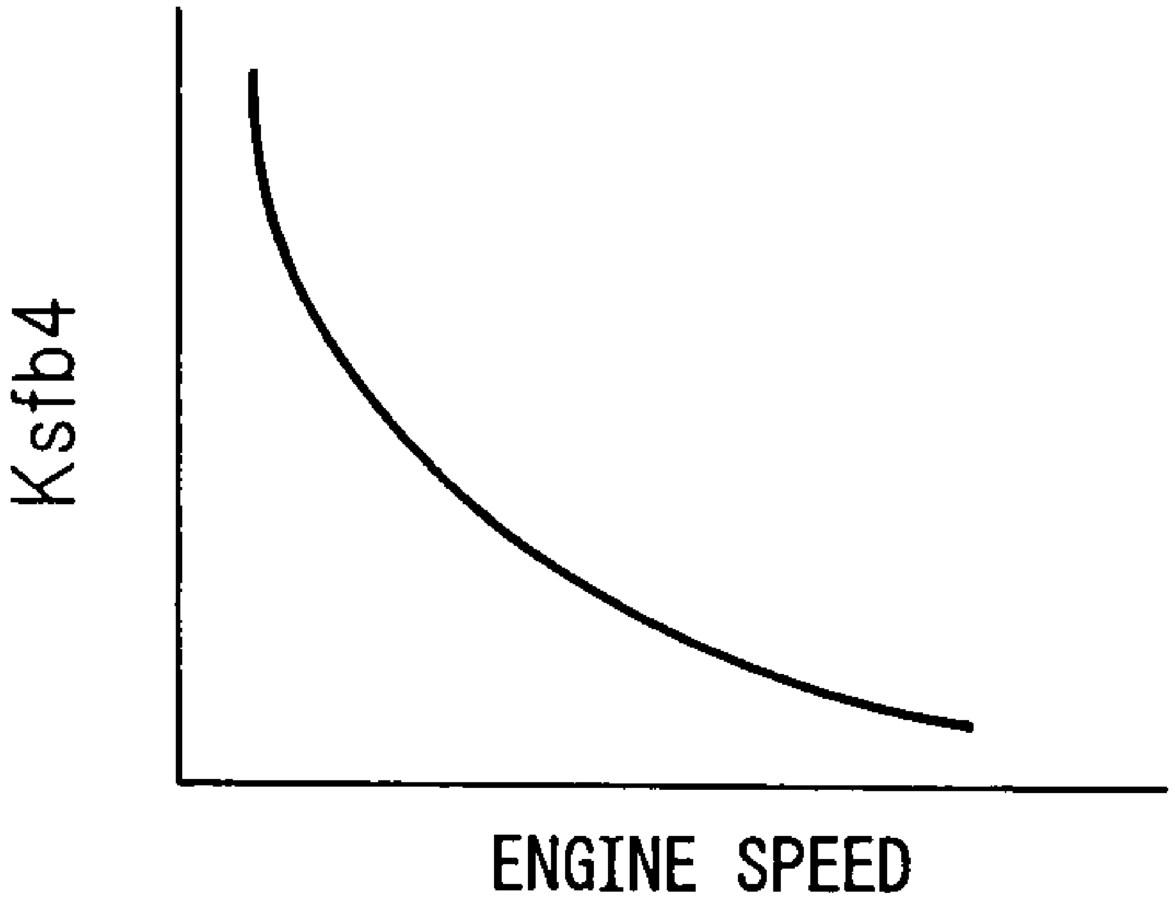
FIG. 13 is a view of an embodiment of a fourth map for calculating a fourth correction coefficient (Ksfb4) set depending on the engine speed and to be multiplied with the integral correction term in PI control by the target air-fuel ratio controlling means 50.

At the next step 702 and step 703, the correction coefficients for multiplication with the proportional (P) correction term and integral (I) correction term in the PI control are calculated based on the intake air amount and engine speed of the internal combustion engine from the maps for calculation of the correction coefficients stored in the target air-fuel ratio processor. FIG. 13 is a view of an embodiment of a fourth map for calculating a fourth correction coefficient (Ksfb4) set depending on the engine speed and to be multiplied with the integral correction term in PI control by the target air-fuel ratio controlling means 50. The first correction coefficient (Ksfb1) set depending on the intake air amount and to be multiplied with the proportional correction term is calculated, in the same way as the embodiment shown in FIG. 1, by the first map shown in FIG. 3.

At step 702, based on the detection information of the intake air amount detecting means 10, the first correction coefficient (Ksfb1) for multiplication with the proportional correction term in the PI control by the target air-fuel ratio controlling means 50 is calculated from the first map stored in the target air-fuel ratio processor (FIG. 3). As shown in FIG. 3, the first correction coefficient to be multiplied with the proportional correction term in that PI control is set smaller the larger the intake air amount. Due to this, in the same way as the operation and effect in the control routine shown in FIG. 2, the correction amount per unit time of the oxygen storage amount of the three-way catalyst 3 can be made constant even if the intake air amount changes, the three-way catalyst atmosphere can be prevented from greatly deviating from the purification window, and the emission state can be improved.

At step 703, based on the detection information of the engine speed detecting means 51, the fourth correction coefficient (Ksfb4) for multiplication with the integral correction term in PI control by the target air-fuel ratio controlling means 50 is calculated from the fourth map stored in the target air-fuel ratio processor (FIG. 13). As shown in FIG. 13, the fourth correction coefficient to be multiplied with the integral correction term is set smaller the larger the engine speed.

At the next step 704, integration is performed for integrating the $O_2$ sensor output error considering the output engine speed to calculate the integral value. Specifically, integration is performed to integrate the value of the $O_2$ sensor output error calculated at step 701 multiplied with the fourth correction coefficient calculated at step 703 to calculate the integral value. Due to this, for example, it is possible to prevent excessive integration of the $O_2$ sensor output error in the case where the engine speed is high, possible to suppress the effect of the engine speed on control for making the correction amount per unit time of the oxygen storage amount of an exhaust purification catalyst having an oxygen storage capacity constant, and possible to prevent deterioration of the exhaust emission. Further, in calculating the integral value, instead of integrating the value of the fourth correction coefficient calculated at step 703 multiplied with the $O_2$ sensor output error to calculate the integral value, it is also possible to integrate the value of the $O_2$ sensor output error divided by the engine speed to calculate the integral value.

At the next step 705, the integral value learning means updates the learning value for the integral value. Specifically, this is done by the value of the integral value calculated at the current step 704 multiplied with the learning update ratio (1/n) being added to the learning value calculated at the previous step 705. Here, the "learning update ratio (1/n)" is a parameter for adjusting the learning rate and is suitably determined by the design specifications.

At the next step 706, along with the updating of the learning value for the integral value at step 705, the integral value is corrected. Specifically, this is done by subtracting from the integral value corrected at the previous step 706 the integral value calculated at the current step 704 multiplied with the learning updating ratio.

At the next step 707 and step 708, the proportional (P) correction amount and integral (I) correction amount are calculated based on the values calculated at step 701 to step 706 and the predetermined P gain and I gain in PI control.

At step 707, the $O_2$ sensor output error calculated at step 701, the first correction coefficient (Ksfb1) calculated at step 702, and the P gain are multiplied to calculate the proportional correction amount in PI control by the target air-fuel ratio controlling means 50. At step 708, the integral value of the corrected $O_2$ sensor output error calculated at step 706 and the I gain are multiplied to calculate the integral correction amount in PI control by the target air-fuel ratio controlling means 50.

At the next step 709, the learning value, proportional correction amount, and integral correction amount in the PI control by the target air-fuel ratio controlling means 50 calculated at the step 705, step 707, and step 708 are added to calculate the feedback correction amount, then the series of steps of the control routine is ended.

Further, after the series of steps of the control routine shown in FIG. 12 ends, the fuel injection amount controlling means 16 performs feedback control of the fuel injection amount based on the current air-fuel ratio information of the exhaust flowing into the three-way catalyst 3 detected by the linear air-fuel ratio sensor 4 so as to make the air-fuel ratio of the exhaust flowing into that three-way catalyst 3 the target air-fuel ratio controlled by feedback control based on the feedback correction amount calculated at step 709.

Further, in the control routine shown in FIG. 12, learning control with respect to the integral correction term in PI control by the target air-fuel ratio controlling means 50 is used to reduce the processing load of the feedback control and to improve the control precision. However, the object of the present invention of making the correction amount per unit time of the oxygen storage amount of the exhaust purification catalyst bf the three-way catalyst having an oxygen storage capacity constant even if the intake air amount changes can be achieved even without performing that learning control, so that learning control can be deleted. In that case, step 705 and step 706 in the control routine shown in FIG. 12 become unnecessary.

Figure 14:
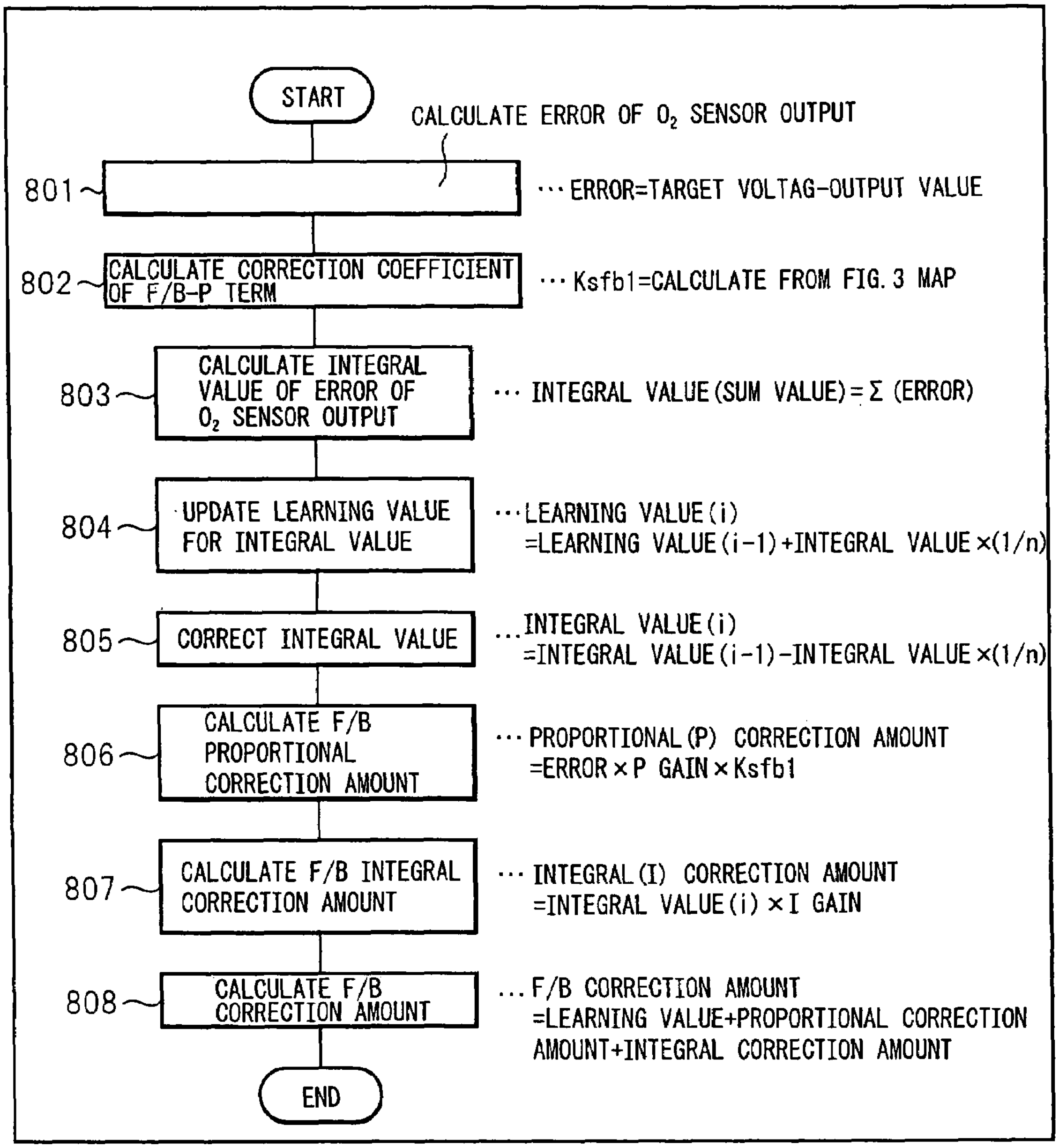
FIG. 14 is a flow chart showing a fourth embodiment of a control routine calculating a correction amount of feedback control of a target air-fuel ratio of exhaust flowing into a three-way catalyst 3 as executed in the internal combustion engine shown in FIG. 11 to which the present air-fuel ratio control system is applied.

FIG. 14 is a flow chart showing a fourth embodiment of a control routine calculating a correction amount of feedback control of a target air-fuel ratio of exhaust flowing into a three-way catalyst 3 as executed in the internal combustion engine shown in FIG. 11 to which the present air-fuel ratio control system is applied. Further, in the control routine of the fourth embodiment shown in FIG. 14, in the same way as the third embodiment shown in FIG. 12, PI control without D control is used to calculate a correction amount of feedback control of a target air-fuel ratio of exhaust flowing into a three-way catalyst 3.

As explained above, when the processing for calculation of the correction amount of the integral correction term in feedback control of a target air-fuel ratio is executed by a processing routine synchronized with each fuel injection, the $O_2$ sensor output error will be integrated with each fuel injection. This will cause a difference in the integral value of the $O_2$ sensor output error per unit time dependent on the engine speed and will cause differences in the correction amount of the integral correction term per unit time. However, by executing the processing for calculation of the correction amount of the integral correction term in the feedback control of a target air-fuel ratio by a processing routine synchronized with each predetermined time, it is possible to make the number of integration operations per unit time constant without being affected by the engine speed and therefore possible to suppress the effects of the engine speed in calculation of the integral correction amount.

Based on this, in the control routine of the fourth embodiment shown in FIG. 14, the processing for calculation of the integral correction amount in the feedback control by the target air-fuel ratio controlling means 50 in the control routine of the fourth embodiment is executed not by a processing routine synchronized with each fuel injection, but by a processing routine synchronized with each predetermined time. Due to this, it is possible to suppress the effects of the engine speed on the control for making the correction amount per unit time of the oxygen storage amount of an exhaust purification catalyst having an oxygen storage capacity constant and possible to prevent deterioration of the exhaust emission.

In the control routine shown in FIG. 14, step 801 and step 802 and step 804 to step 808 are similar to step 701 and step 702 and to step 705 to step 709 in the control routine shown in FIG. 12, so explanations will be omitted.

Below, only step 803 will be explained.

The processing for calculation of the integral correction amount in the feedback control by the target air-fuel ratio controlling means 50 in the control routine of the fourth embodiment shown in FIG. 14 is not executed by a processing routine synchronized with each fuel injection, but is executed by a processing routine synchronized with each predetermined time, so the effect of the engine speed in calculation of the correction amount of the integral correction term is small. For that reason, at step 803, when integration is performed integrating the $O_2$ sensor output error to calculate an integral value, the integration for integrating the values of the $O_2$ sensor output error multiplied with the fourth correction coefficient such as in step 704 of the control routine shown in FIG. 12 is not performed. The integration directly integrating the $O_2$ output sensor output error calculated at step 801 is performed.

Further, referring to FIG. 12 and FIG. 14, embodiments of two control routines of PID control calculating the correction amount of feedback control of a target air-fuel ratio of exhaust flowing into the three-way catalyst 3 as executed in an internal combustion engine shown in FIG. 11 to which the present air-fuel ratio control system is applied were shown, but for the correction amount of feedback control of a target air-fuel ratio of exhaust flowing into a three-way catalyst 3, correction amounts calculated by PID control such as shown in FIG. 2 and FIG. 5 may also be applied. In that case, the step relating to the differential (D) correction term of the control routine shown in FIG. 2 and FIG. 5 is added to the control routine shown in FIG. 12 and FIG. 14. Further, the correction coefficient set larger the larger the load rate or intake air amount such as in the control routine shown in FIG. 2 and FIG. 5 may be applied for calculation of the integral correction amount. Further, the correction coefficient set larger the larger the maximum oxygen storage amount such as in the control routine shown in FIG. 5 may be applied for calculation of the proportional correction amount or differential correction amount.

Incidentally, in an internal combustion engine, when a fuel feed cut is executed, the air sucked into the internal combustion engine flows into the exhaust purification catalyst as it is, so a state of oxygen excess occurs in the exhaust purification catalyst. In this state, the purification action of the exhaust purification catalyst ends up dropping, so there is a technique of quickly restoring it to a suitable state by making the air-fuel ratio of the exhaust purification catalyst atmosphere at the time of restoration from a fuel feed cut a rich air-fuel ratio, that is, “rich control”. When the above rich control is executed in a state where feedback control is applied multiplying the proportional correction term and differential correction term with a first correction coefficient set smaller the larger the intake air amount (Ksfb1) to calculate the feedback correction amount in target air-fuel ratio feedback control, this small amount of intake air at the time of restoration from a fuel feed cut may cause deterioration of the exhaust emission. In particular, when the above rich control is executed at the time of natural restoration from a fuel feed cut such as where a fuel feed cut is continued until an idling state where the intake air amount is extremely small is reached, then the normal feed is restored in the state where that target air-fuel ratio feedback control is being applied, since the intake air amount is extremely small, control ends up being exercised so that the correction amount in target air-fuel ratio feedback control is increased, the exhaust purification catalyst atmosphere once made a rich air-fuel ratio is once ended up returned immediately to a lean air-fuel ratio atmosphere, and the drop in the exhaust purification action cannot be sufficiently restored. There is therefore a large possibility of causing a deterioration of exhaust emissions.

Based on this, at the time of the above such rich control, control prohibiting multiplication of the proportional correction term and differential correction term with the first correction coefficient (Ksfb1) set depending on the intake air amount under predetermined conditions in the target air-fuel ratio feedback control by the target air-fuel ratio controlling means is further added to the control routine of the target air-fuel ratio feedback control.

Figure 15:
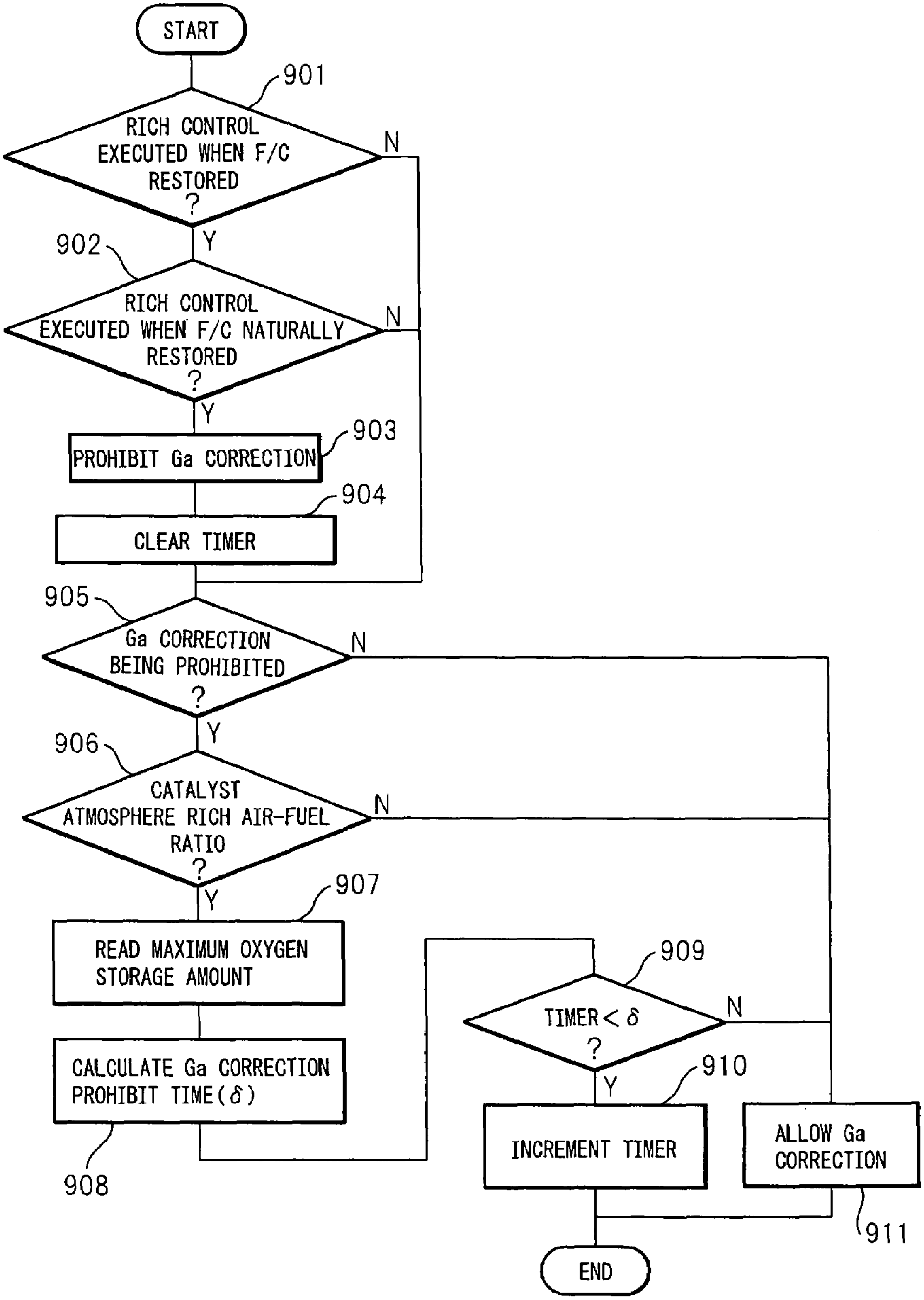
FIG. 15 is a view of an embodiment of a control routine for prohibiting multiplication with the first correction coefficient (Ksfb1) set depending on the intake air amount under predetermined conditions when executing rich control at the time of natural restoration of feed from a fuel feed cut where the fuel feed cut is continued until an idling state where the intake air amount becomes extremely small, then the feed of fuel is restored.

FIG. 15 is a view of an embodiment of a control routine for prohibiting multiplication with the first correction coefficient (Ksfb1) set depending on the intake air amount under predetermined conditions when executing rich control at the time of natural restoration from a fuel feed cut where the fuel feed cut is continued until an idling state where the intake air amount becomes extremely small, then the feed of fuel is restored. In the control routine shown in FIG. 15, the rich control state judging means 52 judges if the operation state is the rich control state at the time of restoration from a fuel feed cut and if that rich control state is rich control at the time of natural restoration from a fuel feed cut. If it is judged to be rich control at the time of natural restoration from a fuel feed cut, correction by multiplication with a first correction coefficient (Ksfb1) set depending on the intake air amount (hereinafter referred to as the “Ga correction”) is prohibited for a predetermined period. Due to this, the exhaust purification catalyst atmosphere can reliably be made a rich air-fuel ratio and the purification action of the exhaust purification catalyst which dropped due to the fuel feed cut can be restored to a suitable state quickly.

Below, details of the steps will be explained.

First, at step 901 and step 902, the rich control state judging means 52 judges if the operation state of the internal combustion engine is one in the middle of execution of rich control at the time of restoration from a fuel feed cut and if that rich control state is rich control at the time of natural restoration from a fuel feed cut. If it is judged that the operation state of the internal combustion engine is the rich control state at the time of restoration from a fuel feed cut and that rich control state is rich control at the time of natural restoration from a fuel feed cut, the routine proceeds to the next step 903.

At step 903, Ga correction is prohibited, then at the next step 904, the time count for counting the duration of rich control from natural restoration from a fuel feed cut is cleared. At the next step 905, it is judged if the Ga correction is being prohibited. If it is judged that the Ga correction is being prohibited, the routine proceeds to the next step 906.

At step 906, it is judged if the three-way catalyst atmosphere is in a rich air-fuel ratio state based on the state detected from the $O_2$ sensor 5. If it is judged that the three-way catalyst atmosphere is a rich air-fuel ratio state, the routine proceeds to the next step 907 and step 908.

At step 907 and step 908, the maximum oxygen storage amount of the three-way catalyst 3 detected by the oxygen storage capacity detecting means 12 is read into the target air-fuel ratio processor of the target air-fuel ratio controlling means 50. Based on the detection information of the detected maximum oxygen storage amount of the three-way catalyst 3, a predetermined time for prohibiting Ga correction is calculated from the fifth map stored in the target air-fuel ratio processor (FIG. 16). FIG. 16 is a view of a fifth map calculating a Ga correction prohibit time (δ) set depending on the maximum oxygen storage amount of a three-way catalyst 3 and used when rich control is executed at the time of natural restoration from a fuel feed cut. As shown in FIG. 16, the Ga correction prohibit time at the time when rich control at natural restoration from a fuel feed cut is executed is set larger the larger the maximum oxygen storage amount. Due to this, the smaller the maximum oxygen storage amount of the three-way catalyst 3, the shorter the Ga correction prohibit time at the time of execution of rich control at natural restoration from a fuel feed cut can be controlled to, the three-way catalyst atmosphere can be prevented from greatly deviating from the purification window even when the maximum oxygen storage amount of the three-way catalyst 3 degrades or drops, and the exhaust emission can be improved.

At the next step 909, it is judged whether the time count cleared at step 904 has reached the Ga correction prohibit time calculated at step 908. When the time elapsed from when rich control at natural restoration from a fuel feed cut is started has not reached the Ga correction prohibit time, the routine proceeds to step 910 where rich control is further continued and the time count is incremented, that is, the duration of the rich control is counted. When the time from which rich control at natural restoration from a fuel feed cut is started reaches the Ga correction prohibit time, the routine proceeds to step 911 where Ga correction is allowed.

According to the control routine prohibiting Ga correction shown in FIG. 15 under predetermined conditions, at the time of rich control at restoration from a fuel feed cut, in particular at the time of rich control at natural restoration from a fuel feed cut, Ga correction can prevent a three-way catalyst atmosphere once made rich from ending up immediately being returned to a lean atmosphere, the purification action of the exhaust purification catalyst which dropped due to the fuel feed cut can be restored to a suitable state early, and deterioration of the exhaust emissions can be suppressed.

Further, the present invention was explained based on specific embodiments, but a person skilled in the art could make various changes, corrections, etc. without departing from the claims and ideas of the present invention.

The invention claimed is:

1. An air-fuel ratio control system of an internal combustion engine comprising:

an exhaust purification catalyst having an oxygen storage capacity arranged in an exhaust passage of the internal combustion engine, storing oxygen in the exhaust when a concentration of oxygen in inflowing exhaust is in excess, and releasing stored oxygen when the concentration of oxygen in the exhaust is insufficient, an intake air amount detecting means for detecting an intake air amount of said internal combustion engine, a linear air-fuel ratio sensor arranged at an upstream side of said exhaust purification catalyst and having an output characteristic substantially proportional to an air-fuel ratio of the exhaust, an $O_2$ sensor arranged at a downstream side of said exhaust purification catalyst and sensing if an air-fuel ratio of the exhaust is rich or lean, a target air-fuel ratio controlling means for performing feedback control of a target air-fuel ratio of exhaust flowing into said exhaust purification catalyst based on detection information from said intake air amount detecting means and said $O_2$ sensor, and a fuel injection amount controlling means for performing feedback control of the fuel injection amount based on output information of said linear air-fuel ratio sensor so as to control said air-fuel ratio of the exhaust flowing into the exhaust purification catalyst to said target air-fuel ratio, said air-fuel ratio control system of an internal combustion engine characterized in that said target air-fuel ratio controlling means performs feedback control of said target air-fuel ratio so that even when said intake air amount changes, a correction amount per unit time of an oxygen storage amount of said exhaust purification catalyst is made constant.

2. An air-fuel ratio control system of an internal combustion engine as set forth in claim 1, wherein:

said target air-fuel ratio controlling means executes target air-fuel ratio feedback control for at least PI control of the target air-fuel ratio, a proportional (P) correction term in said PI control is multiplied with a predetermined first correction coefficient set smaller the larger said intake air amount, and an integral (I) correction term is multiplied with a predetermined second correction coefficient set larger the larger said intake air amount.

3. An air-fuel ratio control system of an internal combustion engine as set forth in claim 2, wherein:

said air-fuel ratio control system of an internal combustion engine further having an oxygen storage capacity detecting means for detecting a maximum oxygen storage amount of said exhaust purification catalyst, and said proportional correction term is further multiplied with a predetermined fourth correction coefficient set larger the larger said maximum oxygen storage amount.

4. An air-fuel ratio control system of an internal combustion engine as set forth in claim 2, wherein:

said air-fuel ratio control system of an internal combustion engine further has a startup state judging means for detecting a duration from startup of said internal combustion engine and judging if said internal combustion engine is in a state immediately after startup, and said startup state judging means judges that said internal combustion engine is in a state immediately after startup when the duration from startup of said internal combustion engine has not reached a predetermined time and prohibits correction by multiplication with said first correction coefficient in said target air-fuel ratio feedback control.

5. An air-fuel ratio control system of an internal combustion engine as set forth in claim 2, wherein:

said air-fuel ratio control system of an internal combustion engine further has an F/C state judging means for detecting a duration of a state where feed of fuel to said internal combustion engine is cut and a duration from when the cut of feed of fuel to said internal combustion engine is suspended and fuel feed is restored and judging if said internal combustion engine is in the fuel feed cut state, said F/C state judging means judging that said internal combustion engine is in a fuel feed cut state when the fuel feed cut of said internal combustion engine continues for a predetermined time or more or when a duration of fuel feed after suspension of the fuel feed cut of said internal combustion engine has not reached a predetermined time and prohibiting correction by multiplication with said first correction coefficient in said target air-fuel ratio feedback control.

6. An air-fuel ratio control system of an internal combustion engine as set forth in claim 2, wherein:

said air-fuel ratio control system of an internal combustion engine further has an idling state judging means for detecting a duration of an idling state of said internal combustion engine and a duration from start of normal operation after the end of idling of said internal combustion engine and judging if said internal combustion engine is in an idling state, said idling state judging means judging that said internal combustion engine is in an idling state when an idling state of said internal combustion engine continues for a predetermined time or more or when a duration of normal operation after the end of idling of said internal combustion engine has not reached a predetermined time and prohibiting correction by multiplication with said first correction coefficient in said target air-fuel ratio feedback control.

7. An air-fuel ratio control system of an internal combustion engine as set forth in claim 2, wherein:

said air-fuel ratio control system of an internal combustion engine further has an engine speed detecting means, where when processing for calculation of said integral correction term in said target air-fuel ratio feedback control is performed by a processing routine synchronized with each fuel injection, said integral correction term is multiplied with a fifth correction coefficient set smaller the larger said engine speed.

8. An air-fuel ratio control system of an internal combustion engine as set forth in claim 2, wherein processing for calculation of said integral correction term in said target air-fuel ratio feedback control is performed by a processing routine synchronized with each predetermined time.

9. An air-fuel ratio control system of an internal combustion engine as set forth in claim 2, wherein:

said air-fuel ratio control system of an internal combustion engine further has a rich control state judging means for judging whether the engine is in a rich control state for making an atmosphere of said exhaust purification catalyst a rich air-fuel ratio quickly when the feed of fuel to said internal combustion engine is restored from a cut state, when said rich control state judging means judges the engine is in said rich control state, it prohibits for a predetermined period correction by multiplication with said first correction coefficient in said target air-fuel ratio feedback control.

10. An air-fuel ratio control system of an internal combustion engine as set forth in claim 2, wherein:

said target air-fuel ratio controlling means executes target air-fuel ratio feedback control for PID control of the target air-fuel ratio, said proportional (P) correction term and differential (D) correction term in said PID control are multiplied with a predetermined first correction coefficient set smaller the larger said intake air amount, and said integral (I) correction term is multiplied with a predetermined second correction coefficient set larger the larger said intake air amount.

11. An air-fuel ratio control system of an internal combustion engine as set forth in claim 10, wherein:

said air-fuel ratio control system of an internal combustion engine further has an oxygen storage capacity detecting means for detecting a maximum oxygen storage amount of said exhaust purification catalyst, said proportional correction term and said differential correction term are further multiplied with a predetermined fourth correction coefficient set larger the larger said maximum oxygen storage amount.

12. An air-fuel ratio control system of an internal combustion engine as set forth in claim 2, wherein:

said air-fuel ratio control system of an internal combustion engine further has a load rate detecting means for detecting a load rate expressing an amount of fresh air charged into each cylinder of said internal combustion engine, said proportional (P) correction term in said PI control is multiplied with said predetermined first correction coefficient set smaller the larger said intake air amount, and said integral (I) correction term is multiplied with, instead of said second correction coefficient, a predetermined third correction coefficient set larger the larger said load rate.

13. An air-fuel ratio control system of an internal combustion engine as set forth in claim 12, wherein:

said target air-fuel ratio controlling means executes target air-fuel ratio feedback control for PID control of the target air-fuel ratio, said proportional (P) correction term and differential (D) correction term in said PID control are multiplied with a predetermined first correction coefficient set smaller the larger said intake air amount, and said integral (I) correction term is multiplied with, instead of said second correction coefficient, a predetermined third correction coefficient set larger the larger said load rate.

14. An air-fuel ratio control system of an internal combustion engine comprising:

an exhaust purification catalyst having an oxygen storage capacity arranged in an exhaust passage of the internal combustion engine, storing oxygen in the exhaust when a concentration of oxygen in inflowing exhaust is in excess, and releasing stored oxygen when the concentration of oxygen in the exhaust is insufficient, an intake air amount detecting means for detecting an intake air amount of said internal combustion engine, a linear air-fuel ratio sensor arranged at an upstream side of said exhaust purification catalyst and having an output characteristic substantially proportional to an air-fuel ratio of the exhaust, an $O_2$ sensor arranged at a downstream side of said exhaust purification catalyst and sensing if an air-fuel ratio of the exhaust is rich or lean, a target air-fuel ratio controlling means for performing feedback control of a target air-fuel ratio of exhaust flowing into said exhaust purification catalyst based on detection information from said intake air amount detecting means and said $O_2$ sensor, and a fuel injection amount controlling means for performing feedback control of the fuel injection amount based on output information of said linear air-fuel ratio sensor so as to control said air-fuel ratio of the exhaust flowing into the exhaust purification catalyst to said target air-fuel ratio, said air-fuel ratio control system of an internal combustion engine characterized in that said target air-fuel ratio controlling means executes target air-fuel ratio feedback control for at least PI control of the target air-fuel ratio, a proportional (P) correction term in said PI control is multiplied with a predetermined first correction coefficient set smaller the larger said intake air amount, and an integral (I) correction term is multiplied with a predetermined second correction coefficient set larger the larger said intake air amount.

15. An air-fuel ratio control system of an internal combustion engine as set forth in claim 14, wherein:

said air-fuel ratio control system of an internal combustion engine further having an oxygen storage capacity detecting means for detecting a maximum oxygen storage amount of said exhaust purification catalyst, and said proportional correction term is further multiplied with a predetermined fourth correction coefficient set larger the larger said maximum oxygen storage amount.

16. An air-fuel ratio control system of an internal combustion engine as set forth in claim 14, wherein:

said air-fuel ratio control system of an internal combustion engine further has a startup state judging means for detecting a duration from startup of said internal combustion engine and judging if said internal combustion engine is in a state immediately after startup, and said startup state judging means judges that said internal combustion engine is in a state immediately after startup when the duration from startup of said internal combustion engine has not reached a predetermined time and prohibits correction by multiplication with said first correction coefficient in said target air-fuel ratio feedback control.

17. An air-fuel ratio control system of an internal combustion engine as set forth in claim 14, wherein:

said air-fuel ratio control system of an internal combustion engine further has an F/C state judging means for detecting a duration of a state where feed of fuel to said internal combustion engine is cut and a duration from when the cut of feed of fuel to said internal combustion engine is suspended and fuel feed is restored and judging if said internal combustion engine is in the fuel feed cut state, said F/C state judging means judging that said internal combustion engine is in a fuel feed cut state when the fuel feed cut of said internal combustion engine continues for a predetermined time or more or when a duration of fuel feed after suspension of the fuel feed cut of said internal combustion engine has not reached a predetermined time and prohibiting correction by multiplication with said first correction coefficient in said target air-fuel ratio feedback control.

18. An air-fuel ratio control system of an internal combustion engine as set forth in claim 14, wherein:

said air-fuel ratio control system of an internal combustion engine further has an idling state judging means for detecting a duration of an idling state of said internal combustion engine and a duration from start of normal operation after the end of idling of said internal combustion engine and judging if said internal combustion engine is in an idling state, said idling state judging means judging that said internal combustion engine is in an idling state when an idling state of said internal combustion engine continues for a predetermined time or more or when a duration of normal operation after the end of idling of said internal combustion engine has not reached a predetermined time and prohibiting correction by multiplication with said first correction coefficient in said target air-fuel ratio feedback control.

19. An air-fuel ratio control system of an internal combustion engine as set forth in claim 14, wherein:

said air-fuel ratio control system of an internal combustion engine further has an engine speed detecting means, where when processing for calculation of said integral correction term in said target air-fuel ratio feedback control is performed by a processing routine synchronized with each fuel injection, said integral correction term is multiplied with a fifth correction coefficient set smaller the larger said engine speed.

20. An air-fuel ratio control system of an internal combustion engine as set forth in claim 14, wherein processing for calculation of said integral correction term in said target air-fuel ratio feedback control is performed by a processing routine synchronized with each predetermined time.

21. An air-fuel ratio control system of an internal combustion engine as set forth in claim 14, wherein:

said air-fuel ratio control system of an internal combustion engine further has a rich control state judging means for judging whether the engine is in a rich control state for making an atmosphere of said exhaust purification catalyst a rich air-fuel ratio quickly when the feed of fuel to said internal combustion engine is restored from a cut state, when said rich control state judging means judges the engine is in said rich control state, it prohibits for a predetermined period correction by multiplication with said first correction coefficient in said target air-fuel ratio feedback control.

22. An air-fuel ratio control system of an internal combustion engine as set forth in claim 14, wherein:

said target air-fuel ratio controlling means executes target air-fuel ratio feedback control for PID control of the target air-fuel ratio, said proportional (P) correction term and differential (D) correction term in said PID control are multiplied with a predetermined first correction coefficient set smaller the larger said intake air amount, and said integral (I) correction term is multiplied with a predetermined second correction coefficient set larger the larger said intake air amount.

23. An air-fuel ratio control system of an internal combustion engine as set forth in claim 22, wherein:

said air-fuel ratio control system of an internal combustion engine further has an oxygen storage capacity detecting means for detecting a maximum oxygen storage amount of said exhaust purification catalyst, said proportional correction term and said differential correction term are further multiplied with a predetermined fourth correction coefficient set larger the larger said maximum oxygen storage amount.

24. An air-fuel ratio control system of an internal combustion engine as set forth in claim 14, wherein:

said air-fuel ratio control system of an internal combustion engine further has a load rate detecting means for detecting a load rate expressing an amount of fresh air charged into each cylinder of said internal combustion engine, said proportional (P) correction term in said PI control is multiplied with said predetermined first correction coefficient set smaller the larger said intake air amount, and said integral (I) correction term is multiplied with, instead of said second correction coefficient, a predetermined third correction coefficient set larger the larger said load rate.

25. An air-fuel ratio control system of an internal combustion engine as set forth in claim 24, wherein:

said target air-fuel ratio controlling means executes target air-fuel ratio feedback control for PID control of the target air-fuel ratio, said proportional (P) correction term and differential (D) correction term in said PID control are multiplied with a predetermined first correction coefficient set smaller the larger said intake air amount, and said integral (I) correction term is multiplied with, instead of said second correction coefficient, a predetermined third correction coefficient set larger the larger said load rate.

* * * * *